US012791087B2

(12) United States Patent
Wink

(10) Patent No.: US 12,791,087 B2
(45) Date of Patent: Nov. 10, 2026

(54) COMPACT GEAR SPEED REDUCER

(71) Applicant: Eaton Intelligent Power Limited, Dublin (IE)

(72) Inventor: Carlos Henrique Wink, Portage, MI (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 0 days.

(21) Appl. No.: 18/842,591

(22) PCT Filed: Mar. 3, 2023

(86) PCT No.: PCT/EP2023/025101

§ 371 (c)(1),
(2) Date: Aug. 29, 2024

(87) PCT Pub. No.: WO2023/165741

PCT Pub. Date: Sep. 7, 2023

(65) Prior Publication Data

US 2025/0172201 A1 May 29, 2025

Related U.S. Application Data

(60) Provisional application No. 63/316,019, filed on Mar. 3, 2022.

(51) Int. Cl.
*F16H 37/08* (2006.01)
*F16H 1/28* (2006.01)
(Continued)

(52) U.S. Cl.
CPC ............. *F16H 37/082* (2013.01); *F16H 1/28* (2013.01); *F16H 57/0037* (2013.01);
(Continued)

(58) Field of Classification Search
CPC ......... F16H 57/021; F16H 2057/02034; F16H 1/28; F16H 57/0037; B60K 2001/001; B60K 7/0007; B60K 17/145
(Continued)

(56) References Cited

U.S. PATENT DOCUMENTS 6,080,075 A * 6/2000 Wussow ................ F02D 11/10
251/294
6,120,410 A * 9/2000 Taniguchi .............. F16H 3/663
475/285
(Continued)

FOREIGN PATENT DOCUMENTS

DE 198 41 159 C2 5/2000
DE 10 2016 212867 A1 1/2018
DE 10 2017 223158 A1 6/2019

OTHER PUBLICATIONS

English translation of DE19841159A1; https://translationportal.epo.org; Jun. 30, 2025 (Year: 2025).*
(Continued)

*Primary Examiner* — Roger L Pang
(74) *Attorney, Agent, or Firm* — Merchant & Gould. P. C.

(57) ABSTRACT

A compact design of a gear speed reducer for an electric vehicle is disclosed that operates to reduce speed from a high-speed electric motor to a lower speed appropriate for a gearbox designed to accept the lower speed. In an example, the compact gear speed reducer may be installed between the high-speed electric motor and the gearbox. In an example, the compact gear speed reducer may be installed within an enclosure of the electric motor. The compact gear speed reducer may include a ring gear, a sun gear, and a plurality of planet gears operatively connected by a planet carrier.

13 Claims, 30 Drawing Sheets

(51) Int. Cl.
*F16H 57/00* (2012.01)
*F16H 57/021* (2012.01)
*F16H 57/08* (2006.01)
*F16H 57/02* (2012.01)

(52) U.S. Cl.
CPC ......... *F16H 57/021* (2013.01); *F16H 57/082* (2013.01); *F16H 2057/02034* (2013.01)

(58) Field of Classification Search
USPC .................. 475/149, 150, 207, 343; 180/372
See application file for complete search history.

(56) References Cited

U.S. PATENT DOCUMENTS

| | | | | |
|---|---|---|---|---|
| 8,397,502 | B2 * | 3/2013 | Barker .................... | F01P 7/046 475/5 |
| 2005/0006164 | A1 | 1/2005 | Teraoka | |
| 2018/0298987 | A1 * | 10/2018 | Lepan ........................ | F16H 1/28 |
| 2021/0114467 | A1 * | 4/2021 | Suyama ................... | B60K 1/00 |
| 2022/0136601 | A1 * | 5/2022 | Uehara .................... | B60K 1/00 475/150 |

OTHER PUBLICATIONS

International Search Report and Written Opinion for Application No. PCT/EP2023/025101 mailed May 26, 2023.

Volk et al., "Integrated Development Program for Electrified Drivetrains," ATZ Worldwide, https://link.springer.com/content/pdf/10.1007/s38311-020-0251-8.pdf, pp. 40-45 (Jun. 2020).

* cited by examiner

COMPACT GEAR SPEED REDUCER

CROSS-REFERENCE TO RELATED APPLICATION(S)

This application is a National Stage Application of PCT/EP2023/025101, filed on Mar. 3, 2023, which claims the benefit of and priority to U.S. Provisional Application Ser. No. 63/316,019, filed on Mar. 3, 2022, the disclosures of which are incorporated herein by reference in their entireties. To the extent appropriate, a claim of priority is made to each of the above disclosed applications.

BACKGROUND OF THE INVENTION

The gearbox of an electric vehicle transfers power from the vehicle's electric motor to the wheels of the vehicle. Conventional gearboxes for electric vehicles have been designed to operate with conventional electric motors, which output power at a certain rotational shaft speed. However, these conventional electric motors may be large and heavy, and may include large, costly components such as magnets. To decrease the size and cost of electric motors for electric vehicles, a smaller electric motor may be used. These smaller electric motors may be required to operate at a higher speed in order to achieve the same power as the larger, conventional electric motors. Conventional gearboxes, therefore, will not be able to adequately reduce the speed from these smaller electric motors.

SUMMARY

The present disclosure describes a compact design of a gear speed reducer that operates to reduce speed from a smaller, high-speed electric motor to a speed that is equivalent to the speed that an existing design of gearbox was designed to accept from a larger conventional, lower-speed electric motor. The compact gear speed reducer may fit between (operationally and/or physically) the high-speed electric motor and the existing gearbox.

Accordingly, the present application describes, in an example aspect, drive system for an electric vehicle, comprising: a gear speed reducer having a plurality of first gears configured to provide a first speed reduction ratio between a first input and a first output of the gear speed reducer, the plurality of second gears including: a ring gear; a plurality of planet gears intermeshed with the ring gear, wherein the plurality of planet gears are connected to each other by a planet carrier; and a sun gear intermeshed with the plurality of planet gears; wherein one of the sun gear and the planet gears are grounded to the electric motor or to an enclosure of the gear speed reducer; a gearbox having a plurality of second gears configured to provide a second speed reduction ratio between a second input and a second output of the gearbox, the second input being operably connected to the first output, the second output being configured to provide mechanical power for driving the electric vehicle; and an electric motor having a third output operably connected to the first input.

In an aspect, the gear speed reducer is disposed between the electric motor and the gearbox.

In an aspect, the electric motor is disposed between the gear speed reducer and the gearbox.

In an aspect, the gear speed reducer is disposed within a housing of the electric motor.

In an aspect, the gear speed reducer is provided with a cassette housing separate from the gearbox and electric motor.

In an aspect, the first output is directly connected to the planet carrier.

In an aspect, the first output is directly connected to the sun gear.

In an aspect, the first speed reduction ratio is between 1.3 to 1 and 3 to 1.

In an aspect, the first speed reduction ratio is 2 to 1.

In an aspect, wherein the first speed reduction ratio is 3 to 1.

In an aspect, the electric motor provides a rotational speed between 25,000 and 30,000 revolutions per minute at the third output.

In an aspect, the second speed reduction ratio is at least 10 to 1.

The present application describes, in an example aspect, a drive system comprising: an electric motor including a drive output and a housing; a gear speed reducer mounted to the electric motor housing and having a plurality of first gears configured to provide a first speed reduction ratio between a first input, coupled to the electric motor drive output, and a first output, the plurality of first gears including: a ring gear; a plurality of planet gears intermeshed with the ring gear, wherein the plurality of planet gears are connected to each other by a planet carrier; and a sun gear intermeshed with the plurality of planet gears, the sun gear being grounded to the electric motor or to an enclosure of the gear speed reducer; and wherein one of the sun gear and the planet carrier are grounded to the electric motor housing.

In an aspect, the drive system further comprises a back plate mounted to the ring gear on a side opposite the electric motor housing, wherein the back plate and electric motor housing at least partially enclosing the planet gears.

The present application describes, in an example aspect, a gear speed reducer for an electric vehicle, comprising: a first input coupled to an electric motor drive output; a first output; and a plurality of first gears configured to provide a first speed reduction ratio between the first input, coupled to the electric motor drive output, and the first output, the plurality of first gears including: a ring gear; a plurality of planet gears intermeshed with the ring gear, wherein the plurality of planet gears are connected to each other by a planet carrier; and a sun gear intermeshed with the plurality of planet gears, the sun gear being grounded to the electric motor or to an enclosure of the gear speed reducer; and wherein one of the sun gear and the planet carrier are grounded to an electric motor housing.

In an aspect, the first speed reduction ratio is between 1.3 to 1 and 2 to 1.

In an aspect, the planet carrier is formed integral to the first output.

In an aspect, the first speed reduction ratio is 3 to 1.

In an aspect, the first input is connected to the ring gear, the planet carrier is connected to the first output, and the sun gear is grounded to the electric motor housing.

In an aspect, the first input is connected to the sun gear, the ring gear is connected to the first output, and the planet carrier is grounded to the electric motor housing.

In an aspect, the gear speed reducer is enclosed within the electric motor housing.

In an aspect, the gear speed reducer is located external to the electric motor housing, and wherein the gear speed reducer is located between the motor and the gearbox.

In an aspect, the plurality of planet gears rotates about a first bearing, the sun gear rotates about a second bearing, and the ring gear rotates about a third bearing.

The present application describes, in an example aspect, a method comprising: receiving rotation of a first speed from an electric motor at an input, the input rotating a first gear; rotating at least a second gear by the rotation of the first gear, wherein the second gear is connected to an output; providing rotation of a second speed from the output to a gearbox, wherein the first speed is greater than the second speed by a ratio of between 1.3 to 1 and 3 to 1.

In an aspect, the first speed is greater than the second speed by a ratio of between 1.3 to 1 and 2 to 1.

In an aspect, the first speed is greater than the second speed by a ratio of 2 to 1.

In an aspect, the first speed is greater than the second speed by a ratio of 3 to 1.

In an aspect, the first speed is between 25,000 and 30,000 revolutions per minute.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
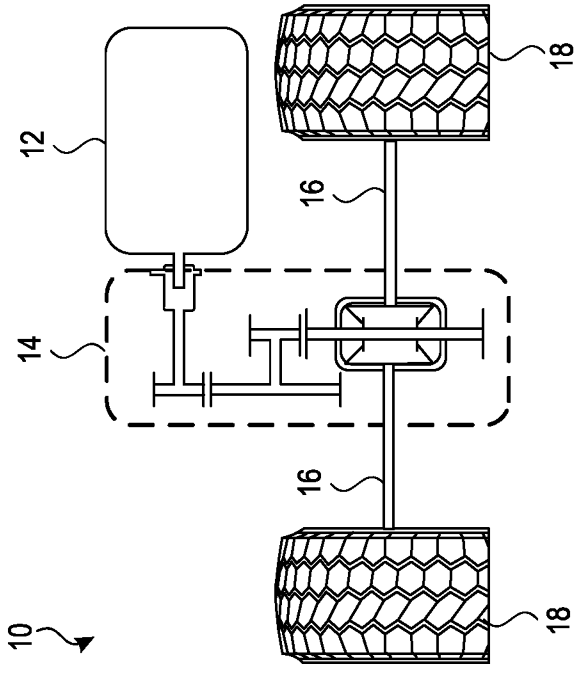
FIG. 1 is a schematic view of an example electric drive system for an electric vehicle, in accordance with the disclosure and within which embodiments of the disclosed gear speed reducer may be utilized.

In the following detailed description, references are made to the accompanying drawings that form a part hereof, and in which are shown, by way of illustrations, specific embodiments, or examples. These aspects may be combined, other aspects may be utilized, and structural changes may be made without departing from the present disclosure. Examples may be practiced as methods, systems, or devices. The following detailed description is therefore not to be taken in a limiting sense, and the scope of the present disclosure is defined by the appended claims and their equivalents.

The gearbox of an electric vehicle transfers power from the vehicle's electric motor to the wheels of the vehicle. Conventional gearboxes for electric vehicles have been designed to operate with conventional electric motors, which output power at a certain rotational shaft speed (often measured in revolutions per minute, RPM). However, these conventional electric motors may be large and heavy, and may include large, costly components such as magnets (for example, neodymium iron boron magnets). To decrease the size and cost of electric motors for electric vehicles, a smaller electric motor may be used (which contain smaller, and therefore lighter and less expensive magnets). These smaller electric motors may be required to operate at a higher speed (higher RPM) in order to achieve the same power as the larger, conventional electric motors, because they have a smaller rotor diameter and therefore generate less torque.

In some examples, conventional electric motors and gearboxes may operate at speeds (RPMs) approximately at ratio of 10 to 1 (ratio of the rotational speed of the output shaft of the motor relative to the rotational speed of the axles of the vehicle). For example, if the conventional electric motor is operating at a speed of approximately 15,000 RPM, power may be transferred to the axle by the gearbox and the axle may rotate at a speed of approximately 1,500 RPM. In some examples, smaller, higher-speed electric motors may operate at speeds up to or in excess of 25,000 RPM to generate power equivalent to the power generated by the larger conventional electric motors. Thus, a higher gear ratio may be required, for example 17 to 1, to maintain torque to the wheels and to reduce to the same appropriate speed at the vehicle wheels. Designing, engineering, sourcing, testing, and building a new style of gearbox to achieve these higher gear ratios is an expensive and time-consuming process.

The present disclosure describes a compact design of a gear speed reducer that operates to reduce speed from a smaller, high-speed electric motor to a speed that is equivalent to the speed that the existing design of gearbox was designed to accept (for example, from a conventional electric motor). The compact gear speed reducer may fit between (operationally and/or physically) the high-speed electric motor and the existing gearbox. For example, the compact gear speed reducer, utilizing a gear ratio of 1.7 to 1, may transfer power from the high-speed motor to a conventionally-designed gearbox, which then may transfer power to the axles/wheels, utilizing its conventional gear ratio of 10 to 1, to achieve the necessary reduction in speed to the axles/wheels while maintaining power. The inclusion of a compact gear speed reducer as described herein may allow for the utilization of lighter, smaller, and less expensive electric motors in electric vehicles while preventing the need for redesign/additional manufacturing of a new style of gearbox (the conventionally designed gearboxes may still be utilized).

FIG. 1 is a schematic view of an example electric drive system 10 for an electric vehicle within which embodiments of the disclosed gear speed reducer may be utilized. The electric motor 12, for example, a conventional electric motor, is operatively connected to a gearbox 14. The gearbox 14 is operatively connected to axles 16 and thereby to wheels 18. The gearbox 14 operates at a particular gear ratio to reduce the output speed of electric motor 12 to a speed appropriate for the axles 16, and transfers power from the electric motor 12 to the axles 16 and wheels 18 to drive the vehicle along a surface.

Figure 2:
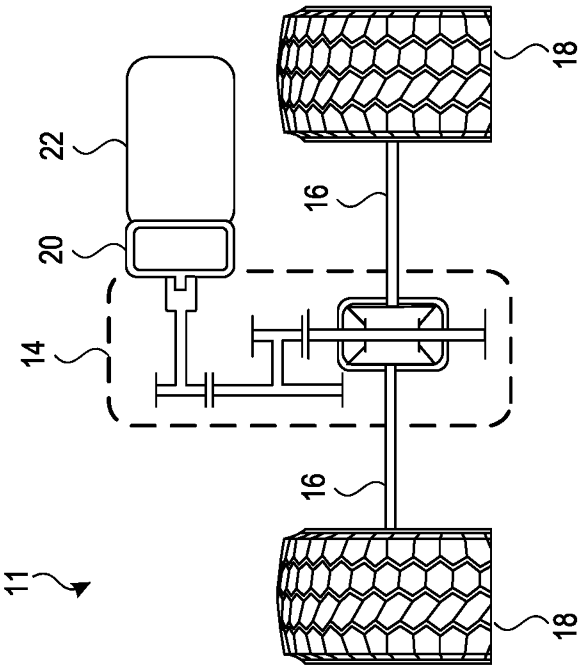
FIG. 2 is a schematic view of an example electric drive system for an electric vehicle, in accordance with the disclosure and within which an embodiment of the disclosed gear speed reducer is utilized.
Figure 3A:
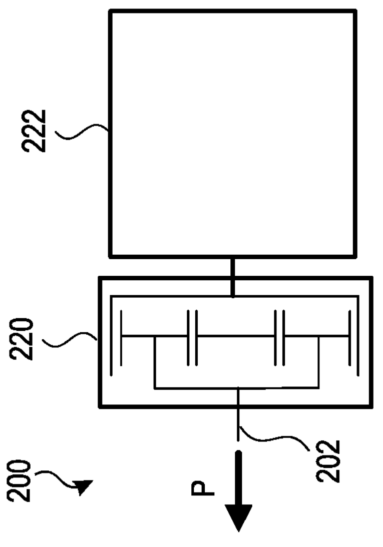
FIG. 3A is a schematic view of a motor and gear speed reducer system in a first configuration, in accordance with the disclosure.
Figure 3B:
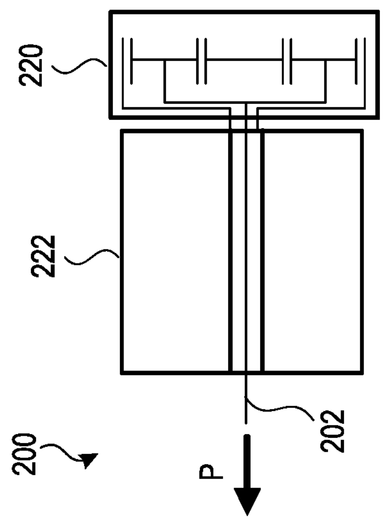
FIG. 3B is a schematic view of a motor and gear speed reducer system in a second configuration, in accordance with the disclosure.
Figure 3C:
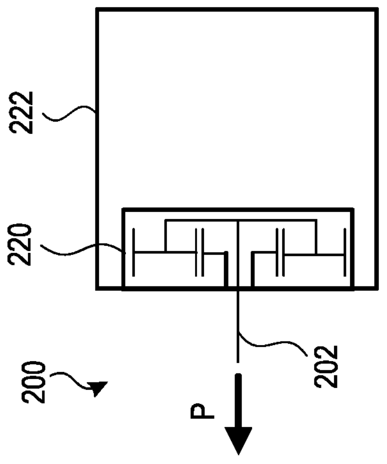
FIG. 3C is a schematic view of a motor and gear speed reducer system in a third configuration, in accordance with the disclosure.
Figure 3D:
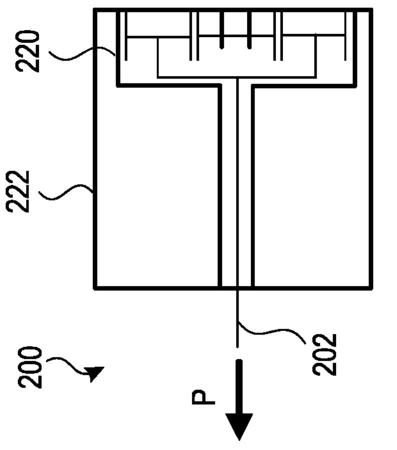
FIG. 3D is a schematic view of a motor and gear speed reducer system in a fourth configuration, in accordance with the disclosure.

FIG. 2 is a schematic view of an example electric drive system 11 for an electric vehicle, within which an embodiment of the disclosed gear speed reducer 20 is utilized. The electric motor 22 is a high-speed electric motor that may be smaller, and lighter than electric motor 12, and that operates at a higher speed (RPM) than electric motor 12.

In some examples, the output speed of the high-speed electric motor 22 (which is the speed provided to the input of the gear speed reducer 20) may be between 16,000 revolutions per minute (RPM) and 25,000 RPM. In some examples, the output speed of the high-speed electric motor 22 may be between 18,000 RPM and 20,000 RPM. In some examples, the output speed of the high-speed electric motor 22 may be between 18,000 RPM and 30,000 RPM. In some examples, the output speed of the high-speed electric motor 22 may be between 20,000 RPM and 30,000 RPM. In some examples, the output speed of the high-speed electric motor 22 may be between 25,000 RPM and 30,000 RPM. In some examples, the output speed of the high-speed electric motor 22 may be between 18,000 RPM and 25,000 RPM. In some examples, the output speed of the high-speed electric motor 22 may be between 18,000 RPM and 50,000 RPM. In some examples, the output speed of the high-speed electric motor 22 may be between 25,000 RPM and 50,000 RPM. In some examples, the output speed of the high-speed electric motor 22 may be between 20,000 RPM and 50,000 RPM. In some examples, the output speed of the high-speed electric motor 22 may be 18,000 RPM. In some examples, the output speed of the high-speed electric motor 22 may be 20,000 RPM. In some examples, the output speed of the high-speed electric motor 22 may be 25,000 RPM. In some examples, the output speed of the high-speed electric motor 22 may be 30,000 RPM. In some examples, the output speed of the high-speed electric motor 22 may greater than or equal to 50,000 RPM.

In some examples, the output speed of the gear speed reducer 20 (which is at or near the upper the limit of the speed required by and provided to the gearbox 14) may be between 8,000 RPM and 16,000 RPM. In some examples, the output speed of the gear speed reducer 20 may be between 14,000 RPM and 16,000 RPM. In some examples, the output speed of the gear speed reducer 20 may be between 15,000 RPM and 16,000 RPM. In some examples, the output speed of the gear speed reducer 20 may be between 14,000 RPM and 15,000 RPM. In some examples, the output speed of the gear speed reducer 20 may be 8,000 RPM. In some examples, the output speed of the gear speed reducer 20 may be 14,000 RPM. In some examples, the output speed of the gear speed reducer 20 may be 15,000 RPM. In some examples, the output speed of the gear speed reducer 20 may be 16,000 RPM.

The electric motor 22 is operatively connected to a compact gear speed reducer (cassette) 20. The gear speed reducer 20 is operatively connected to gearbox 14. Gear speed reducer 20 operates at a particular gear ratio and reduces the output speed of electric motor 22 to the rated inlet speed of gearbox 14 (for example, the same speed as the output speed of the electric motor 12 of FIG. 1). The gearbox 14 operates at a particular gear ratio to reduce the output speed of gear speed reducer 20 to a speed appropriate for the axles 16, and transfers power from the electric motor 22 to the axles 16 and wheels 18 to drive the vehicle along a surface.

In some examples, a gear ratio of the gear speed reducer 20 may be 2 to 1. In some examples, a gear ratio of the gear speed reducer 20 may be 1.2 to 1. In some examples, a gear ratio of the gear speed reducer 20 may be 1.3 to 1. In some examples, a gear ratio of the gear speed reducer 20 may be 2.5 to 1. In some examples, a gear ratio of the gear speed reducer 20 may be 3 to 1. In some examples, a gear ratio of the gear speed reducer 20 may be 1.5 to 1. In some examples, a gear ratio of the gear speed reducer 20 may be between 1.2 to 1 and 2 to 1. In some examples, a gear ratio of the gear speed reducer 20 may be between 1.3 to 1 and 2 to 1. In some examples, a gear ratio of the gear speed reducer 20 may be between 1.3 to 1 and 2.5 to 1. In some examples, a gear ratio of the gear speed reducer 20 may be between 1.2 to 1 and 3 to 1. In some examples, a gear ratio of the gear speed reducer 20 may be between 1.3 to 1 and 3 to 1. In some examples, a gear ratio of the gear speed reducer 20 may be between 2.5 to 1 and 3 to 1. In some examples, a gear ratio of the gear speed reducer 20 may be between 2 to 1 and 3 to 1. In some examples, a gear ratio of the gear speed reducer 20 may be between 1.2 to 1 and 3.5 to 1.

FIGS. 3A-3D illustrate schematic views of an electric motor and gear speed reducer system 200 in a variety of example configurations. In the example configuration of FIG. 3A, the gear speed reducer 220 is operatively connected to the electric motor 222 at the power output of electric motor 222, between electric motor 222 and the gearbox. Gear speed reducer 220 is configured to output power P to the gearbox via an output shaft 202 opposite the electric motor 222. In the example configuration of FIG. 3B, the gear speed reducer 220 is operatively connected to the electric motor 222 at an end of the electric motor 222 opposite the power output of electric motor 222. Gear speed reducer 220 is configured to output power P to the gearbox via an output shaft 202, which passes through the electric motor 222. In the example configuration of FIG. 3C, the gear speed reducer 220 is operatively connected to the electric motor 222 and located inside of the enclosure of the electric motor 222. The gear speed reducer 220 is positioned at the power output of the electric motor 222. Gear speed reducer 220 is configured to output power P to the gearbox via an output shaft 202. In the example configuration of FIG. 3D, the gear speed reducer 220 is operatively connected to the electric motor 222 and located inside of the enclosure of the electric motor 222. The gear speed reducer 220 is positioned at an end of the enclosure opposite the power output of the electric motor 222. Gear speed reducer 220 is configured to output power P to the gearbox via an output shaft 202, which passes through the electric motor 222. Although FIGS. 3A-3D illustrate four possible configurations, other possible configurations may be contemplated.

Figure 4C:
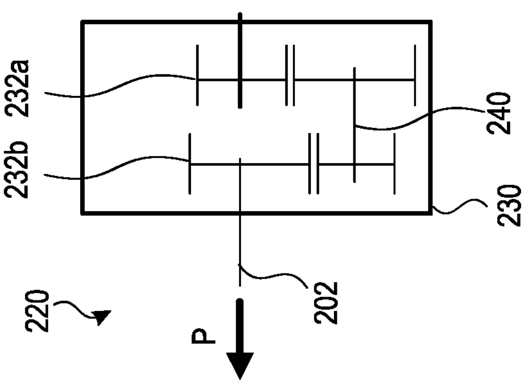
FIG. 4C is a schematic view of a gear speed reducer system in a third configuration, in accordance with the disclosure.
Figure 4B:
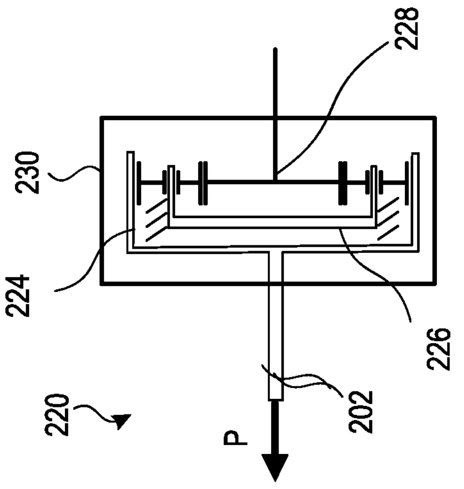
FIG. 4B is a schematic view of a gear speed reducer system in a second configuration, in accordance with the disclosure.
Figure 4A:
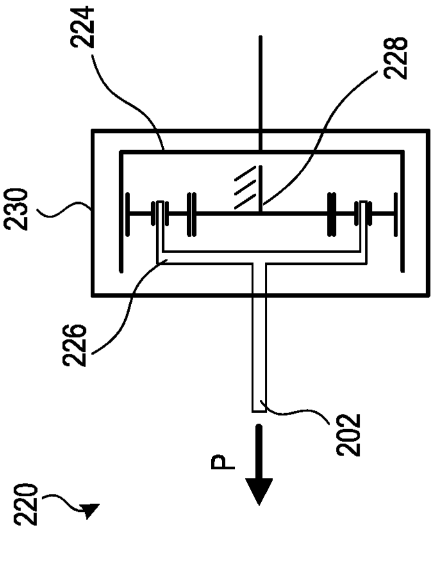
FIG. 4A is a schematic view of a gear speed reducer system in a first configuration, in accordance with the disclosure.

FIGS. 4A-4C illustrate schematic view of a gear speed reducer 220 in a variety of example configurations. Gear speed reducer 220 includes a ring gear 224, a plurality of planet gears carried by a planet carrier 226, and a sun gear 228. In examples, power is transferred among these gears, and the sizes of the gears (and number of gear teeth of each gear) determine the gear ratio of the gear speed reducer 220. In some examples, one of the gears/gear sets may be grounded (i.e. held stationary).

In the example configuration of FIG. 4A, the gear speed reducer 220 may receive power from an electric motor into a ring gear 224. The ring gear 224 may rotate and thereby rotate the planet carrier 226, which rotates the output shaft 202 to transfer power P to a gearbox. The sun gear 228 is grounded in this configuration, and the planet gears will move around the outer perimeter of the sun gear. In the example configuration of FIG. 4B, the gear speed reducer 220 may receive power from an electric motor into a sun gear 228. The sun gear 228 may rotate and thereby rotate the planet gears, and the planet carrier 226 is grounded. The planet gears rotate the ring gear 224, which rotate the output shaft 202 to transfer power P to a gearbox. In the example configuration of FIG. 4C, the gear speed reducer 220 may receive power from an electric motor into a first gear set A 232*a*. Gear set A 232*a* is operably connected to a second gear set B 232*b* via one or more countershafts 240. Rotation of a plurality of gears/gear sets in gear set A 232*a* and gear set B 232*b* transfers rotation and power P to a gearbox via output shaft 202. Example configurations may include one or more gear sets connected by one or more countershafts. Although FIGS. 4A-4C illustrate three possible configurations, other possible configurations may be contemplated.

Figure 5:
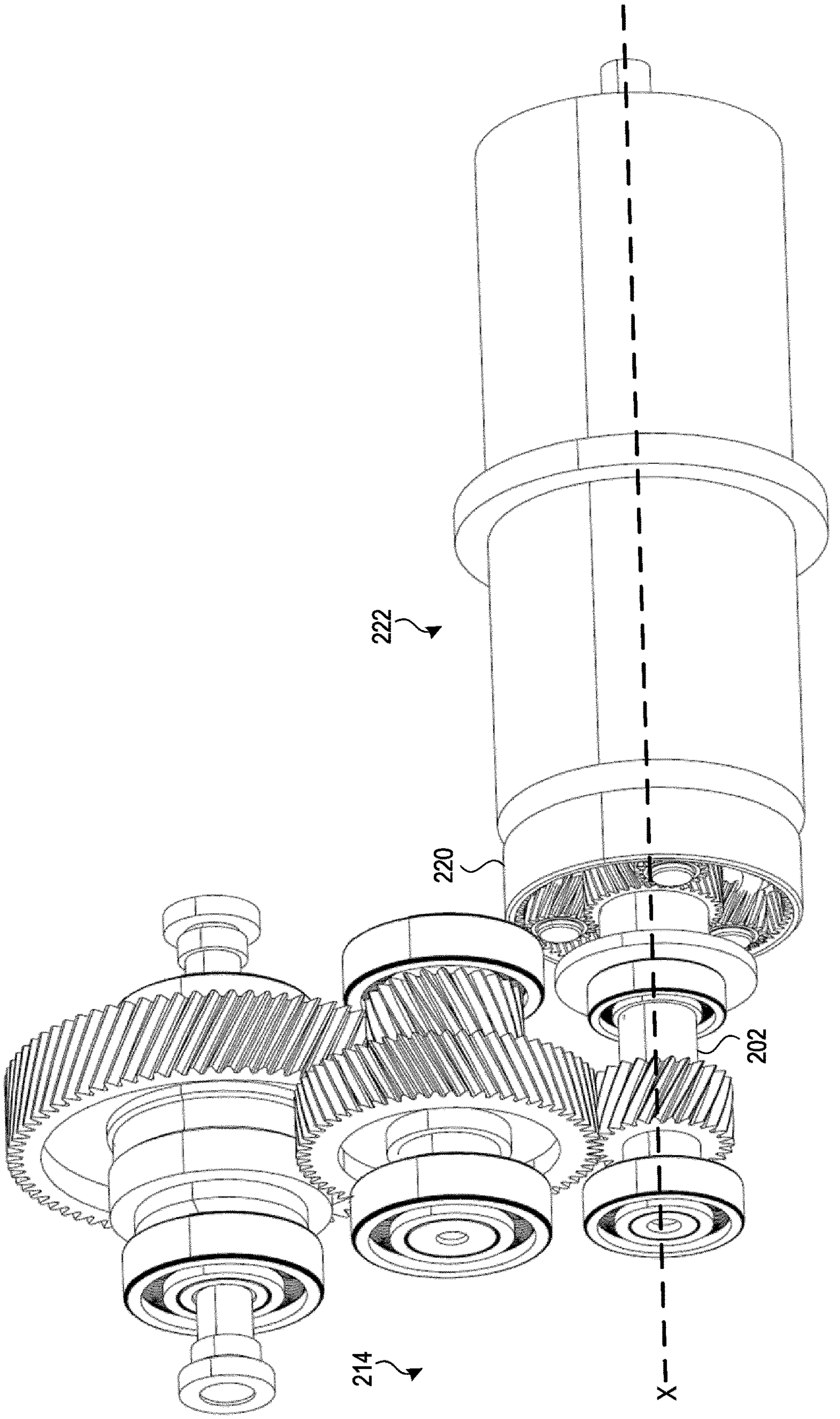
FIG. 5 is a perspective view of a gear speed reducer, electric motor, and gearbox, constructed in accordance with principles of this disclosure, according to an example.
Figure 6:
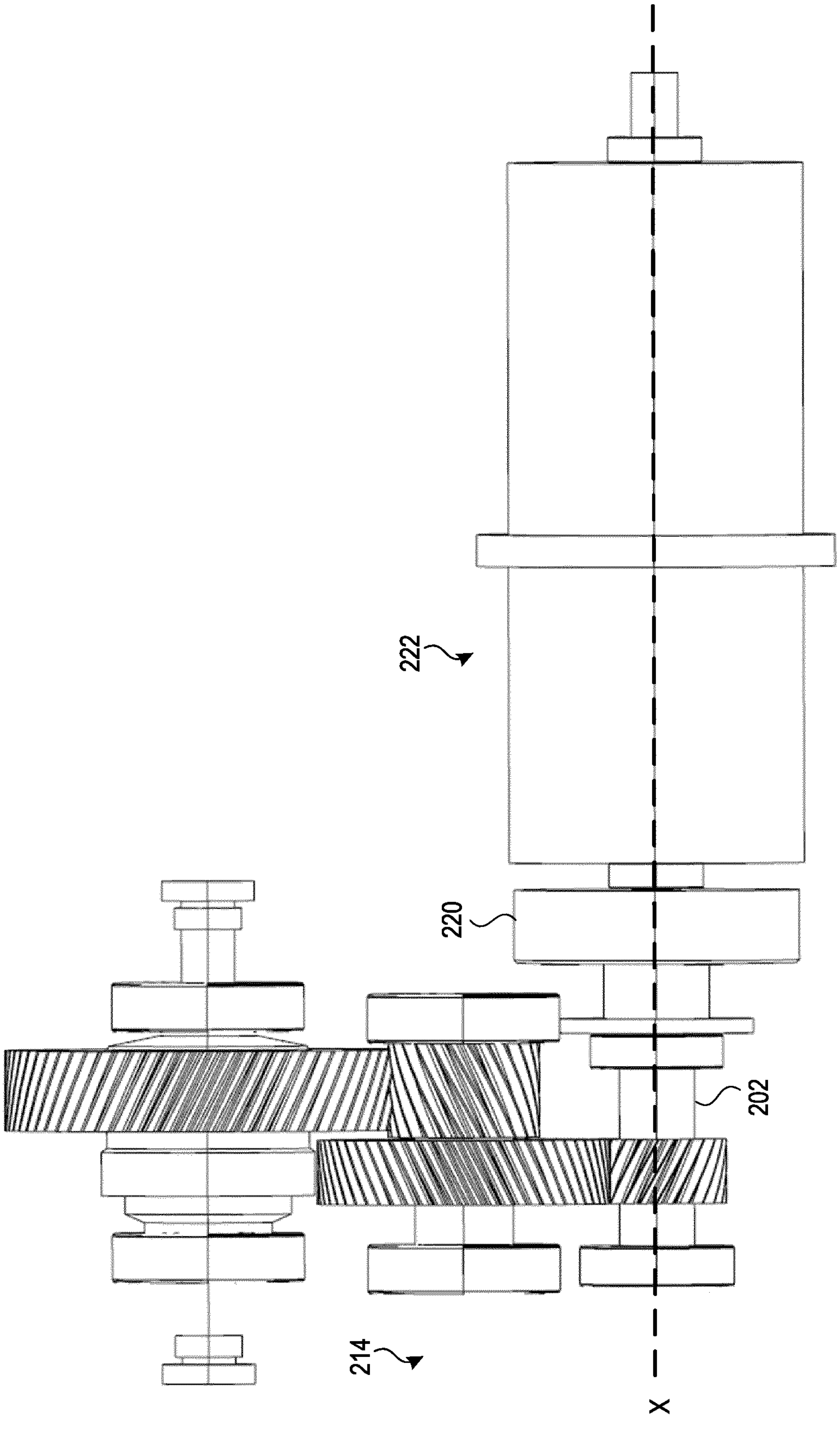
FIG. 6 is a side view of the gear speed reducer, electric motor, and gearbox of FIG. 5.
Figure 7:
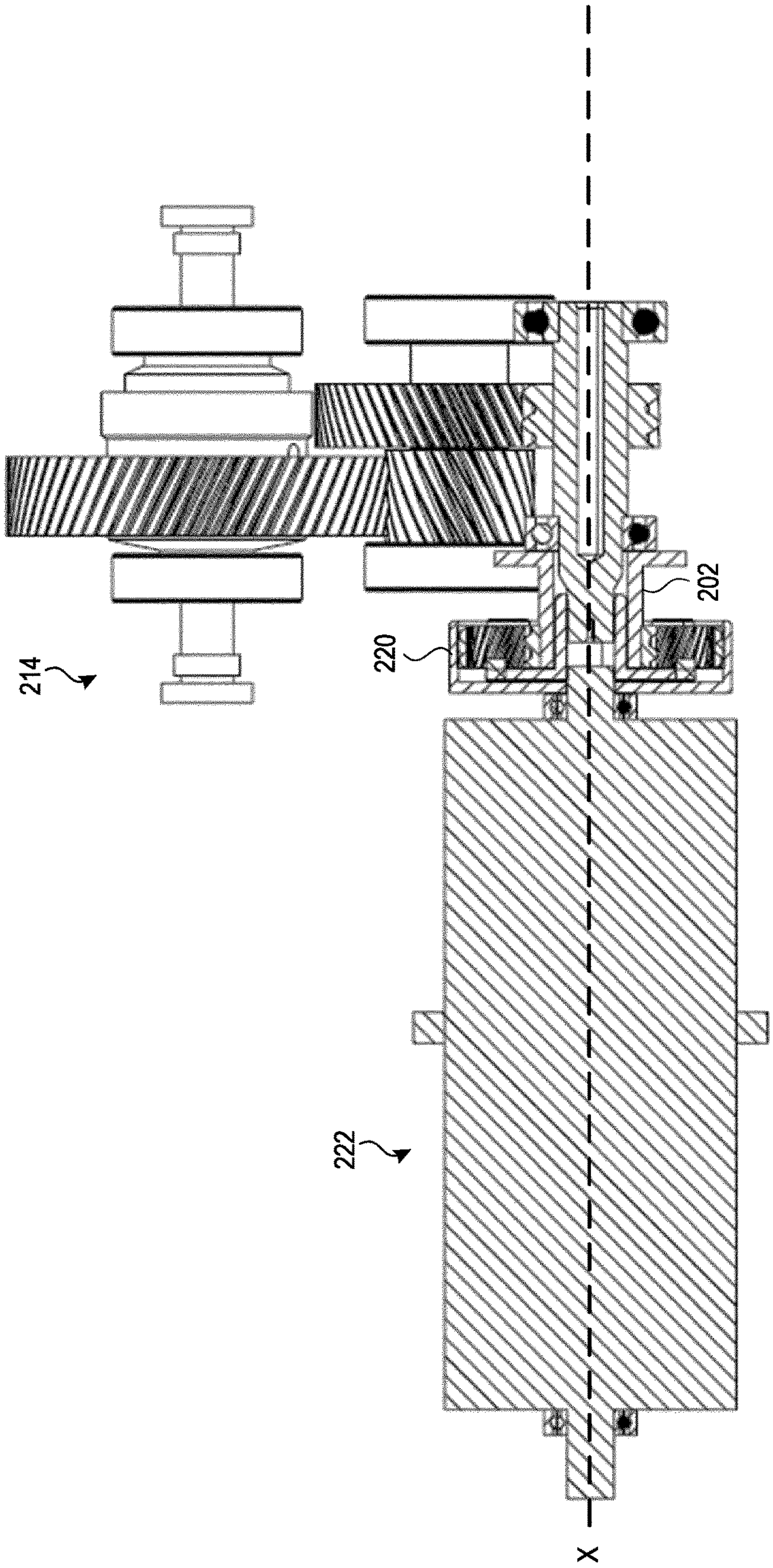
FIG. 7 is a longitudinal cross-sectional side view of the gear speed reducer, electric motor, and gearbox of FIG. 5.
Figure 8:
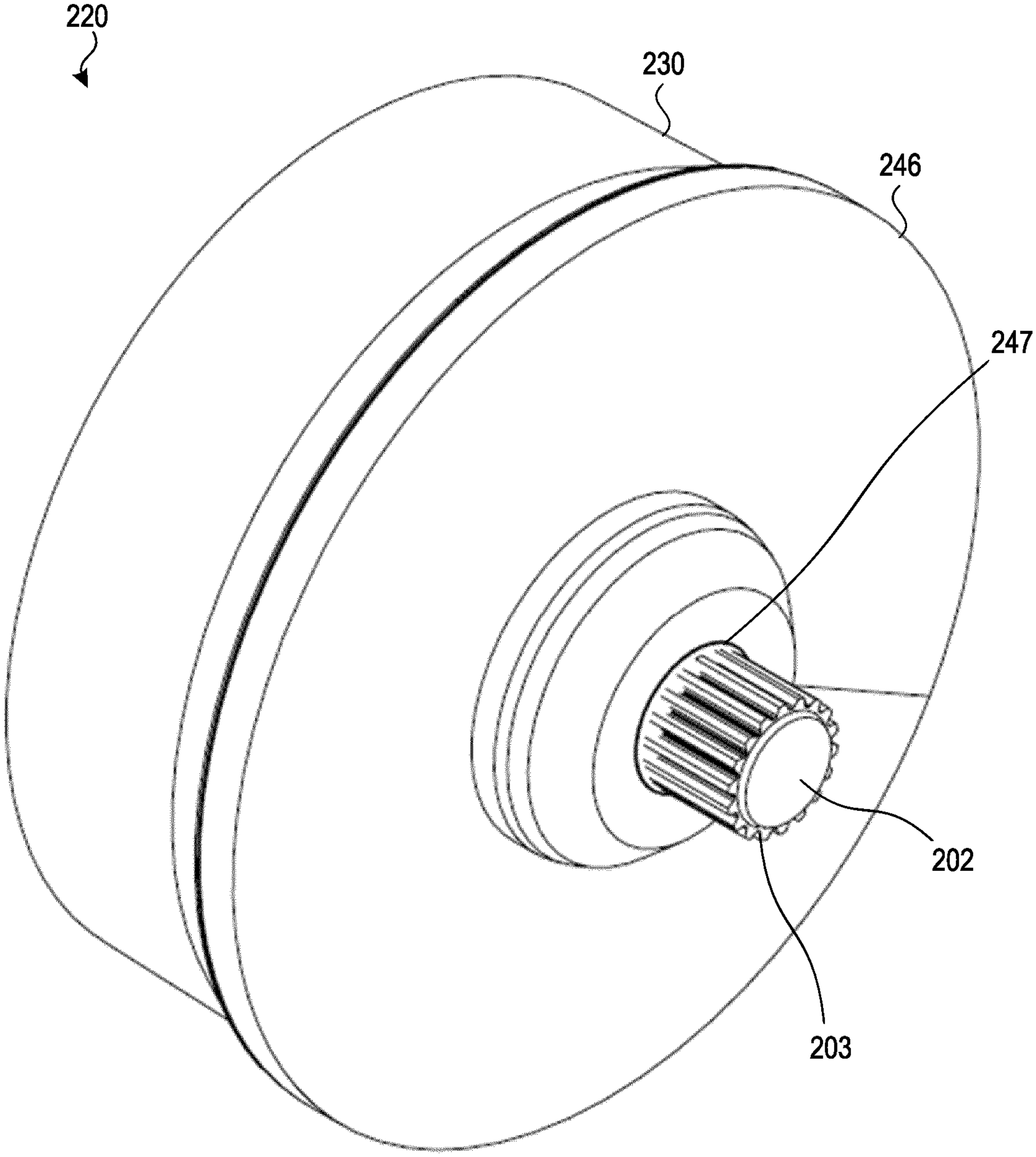
FIG. 8 is a perspective view of a gear speed reducer, constructed in accordance with principles of this disclosure, according to an example.
Figure 9:
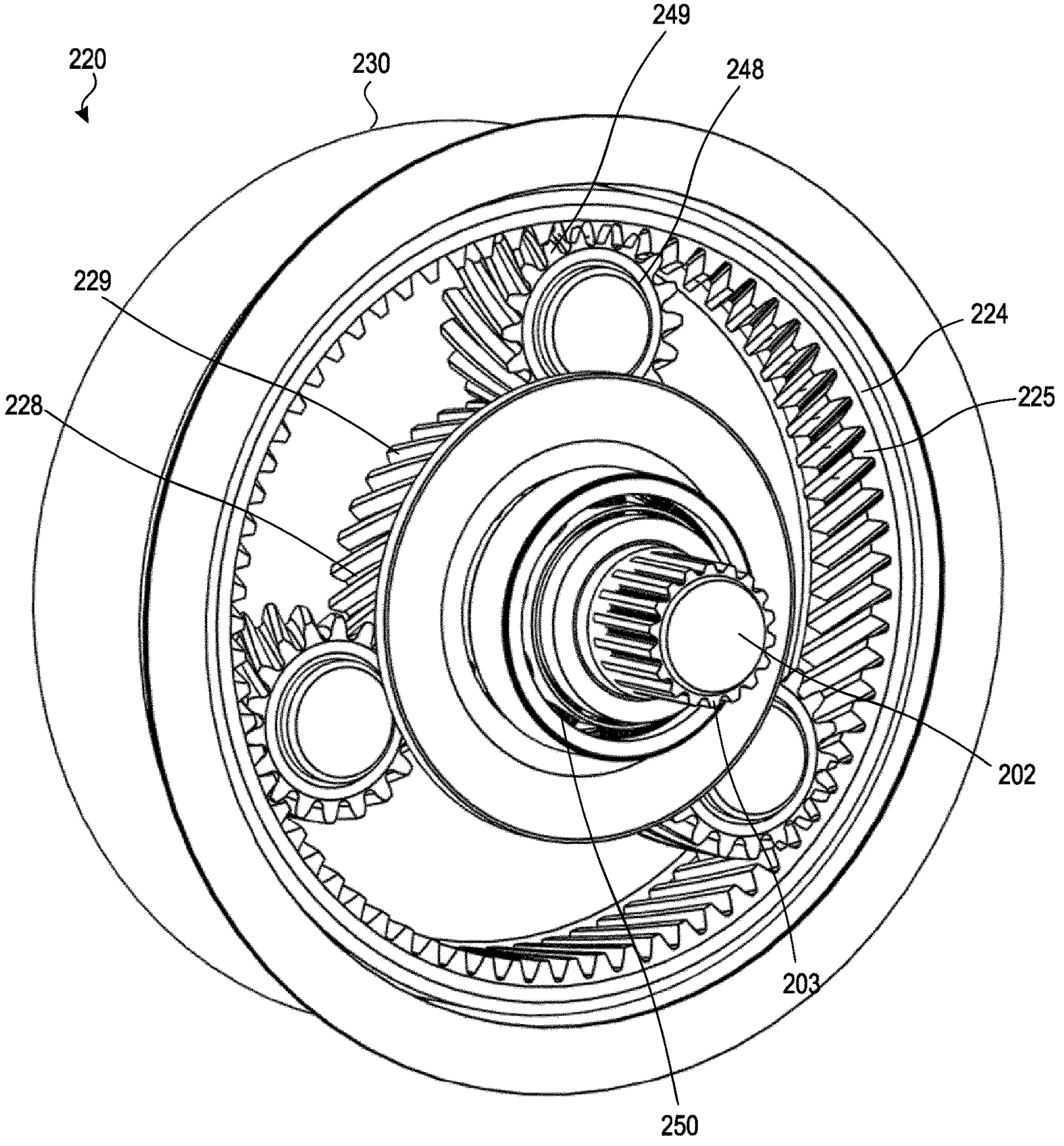
FIG. 9 is a rear perspective view of the gear speed reducer of FIG. 8, with a back cover removed.

FIGS. 5-7 illustrate an example of a gear speed reducer, electric motor, and gearbox. An electric motor 222 is operatively connected to a gear speed reducer (cassette) 220 that sits external to the electric motor 222 at a power output of the electric motor 222. The gear speed reducer 220 is operatively connected at an output shaft 202 to a gearbox 214. The output of electric motor 222, gear speed reducer 220, and output shaft 202 are coaxially aligned along axis X. Gearbox 214 includes a plurality of gears, which receive power and rotation from the gear speed reducer 220. In some examples, the gears of gearbox 214 may be enclosed in a case or enclosure.

FIGS. 8-16 illustrate an example of a gear speed reducer (cassette) 220. In some examples, the gear speed reducer 220 is substantially cylindrically shaped, although other shapes may be contemplated. In some examples, gear speed reducer 220 includes a case or enclosure 230 enclosing the inner gears. The enclosure 230 may include a back cover 246, that is substantially plate or disc-shaped and that has a center opening 247 to allow for protrusion of the output shaft 202 through. The output shaft 202 may, in some examples, include teeth 203 on its external surface. These gears 203 may interface with an adjacent gearbox to transfer rotation/power to the gearbox.

Gear speed reducer 220 includes a plurality of gears and/or gear sets. A ring gear 224 may surround the other gears/gear sets. The internal surface of the ring gear 224 includes teeth 225 that mesh with the teeth 249 of planet gears 248. In the example shown, the gear speed reducer 220 includes three planet gears 248, but in other examples, the gear speed reducer 220 may include three, four, five, six, or more planet gears 248. In some examples, the planet gears 248 are spaced equally apart from one another around the interior surface of the ring gear 224 and the outer surface of the sun gear 228. The sun gear 228 sits at the center of the gear speed reducer 220, and includes teeth 229 on its outer surface that mesh with the teeth 249 of planet gears 248. In some examples, the sun gear 228 surrounds and rotates around one or more sun gear needle bearings 253.

In some examples, the ring gear may include a first portion that is substantially parallel to the planet carrier 226, a second portion that is integral to the input 244 (which may define the front opening 255), and a third portion including the planet gear teeth 249. The first portion may be connected to, fastened to, or formed integral to the third portion in some examples.

Figure 10A:
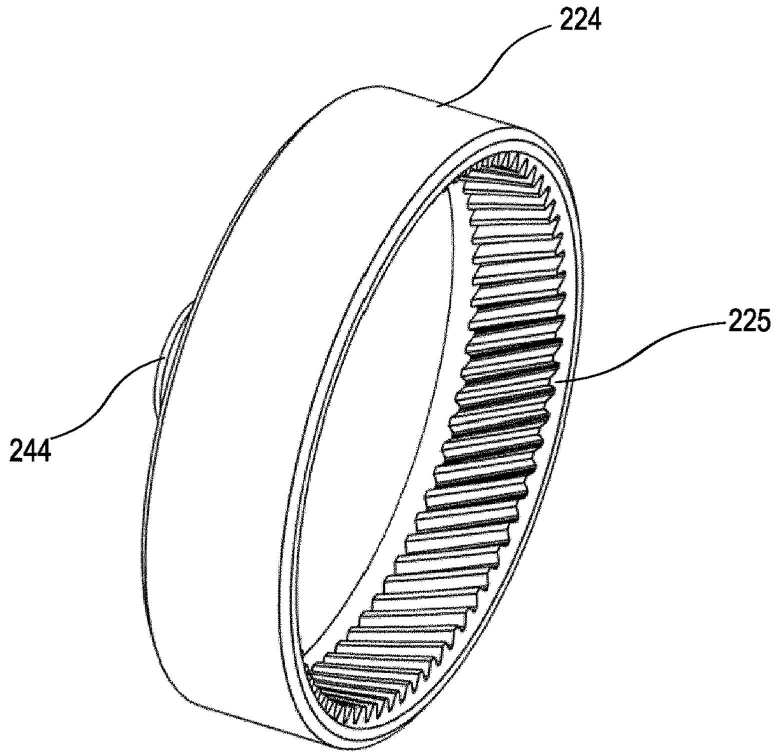
FIG. 10A is a rear perspective view of a ring gear member of the gear speed reducer of FIG. 8.
Figure 10B:
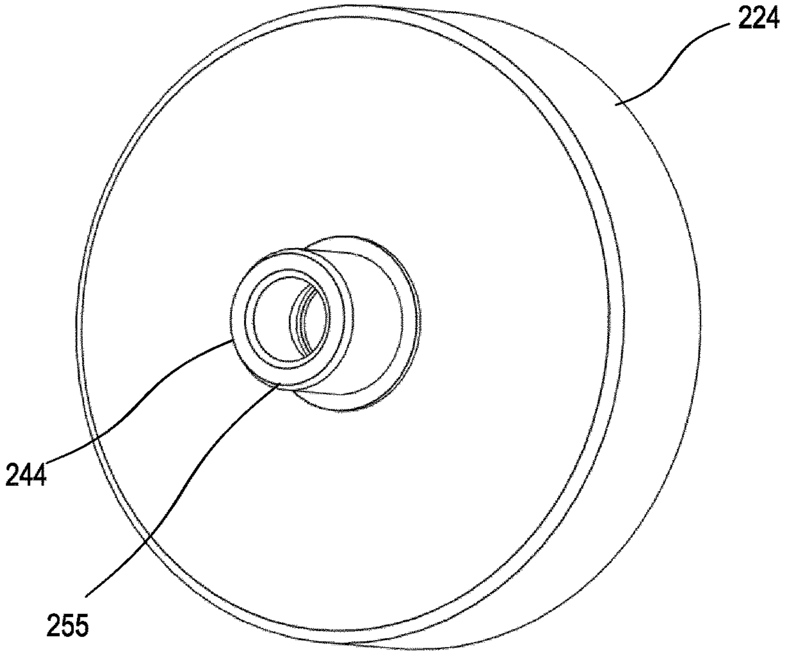
FIG. 10B is a front perspective view of a ring gear member of the gear speed reducer of FIG. 8.
Figure 11A:
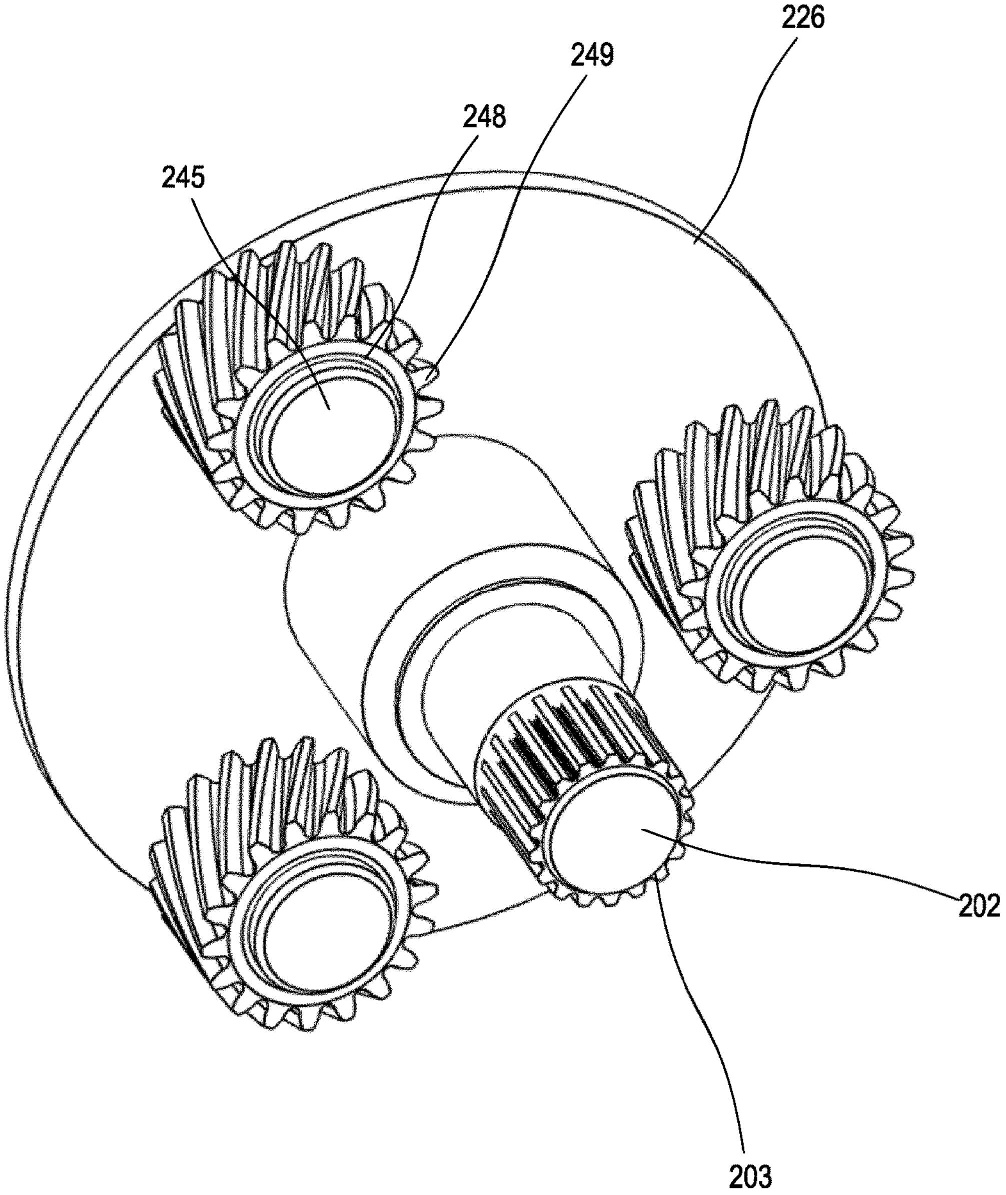
FIG. 11A is a rear perspective view of a planet carrier and planet gears of the gear speed reducer of FIG. 8.
Figure 11B:
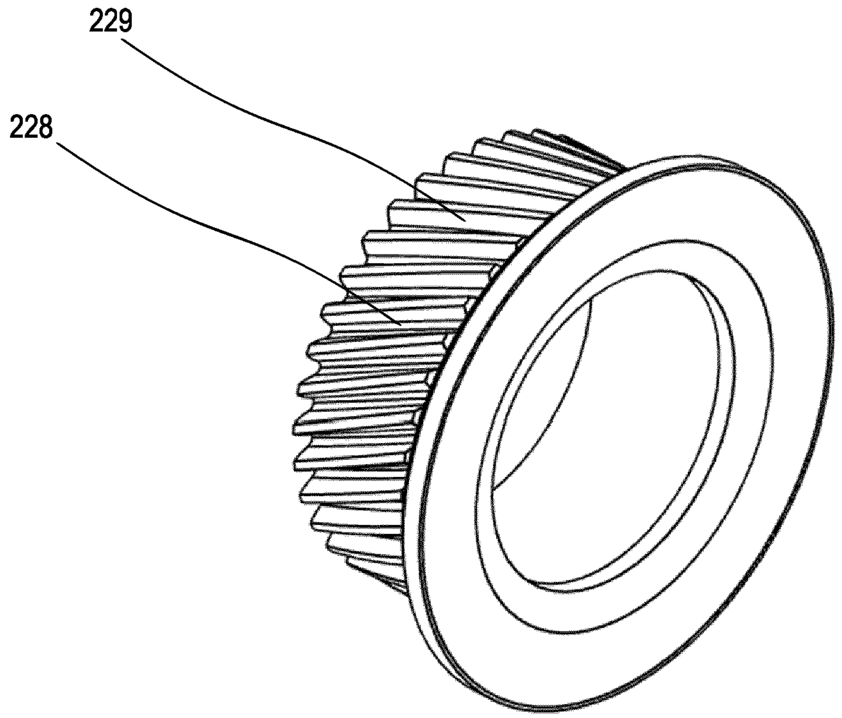
FIG. 11B is a rear perspective view of a sun gear of the gear speed reducer of FIG. 8.
Figure 11C:
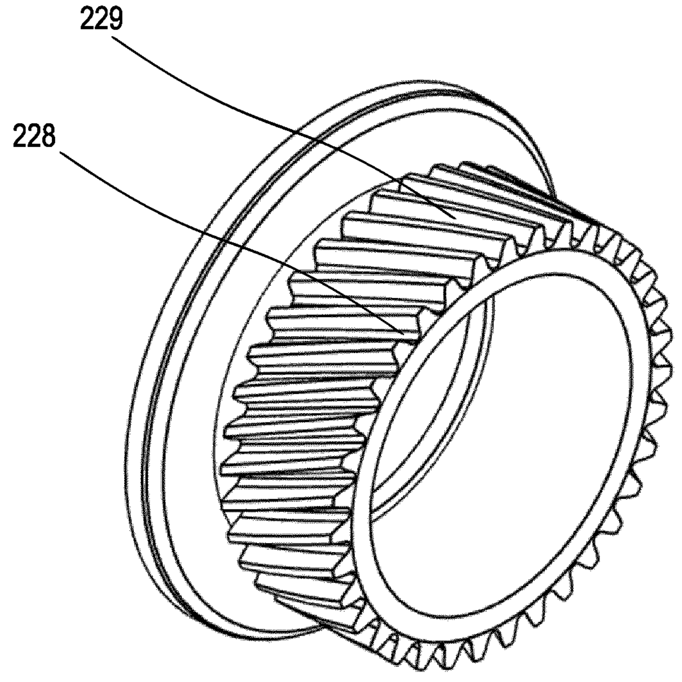
FIG. 11C is a front perspective view of a sun gear of the gear speed reducer of FIG. 8.
Figure 12:
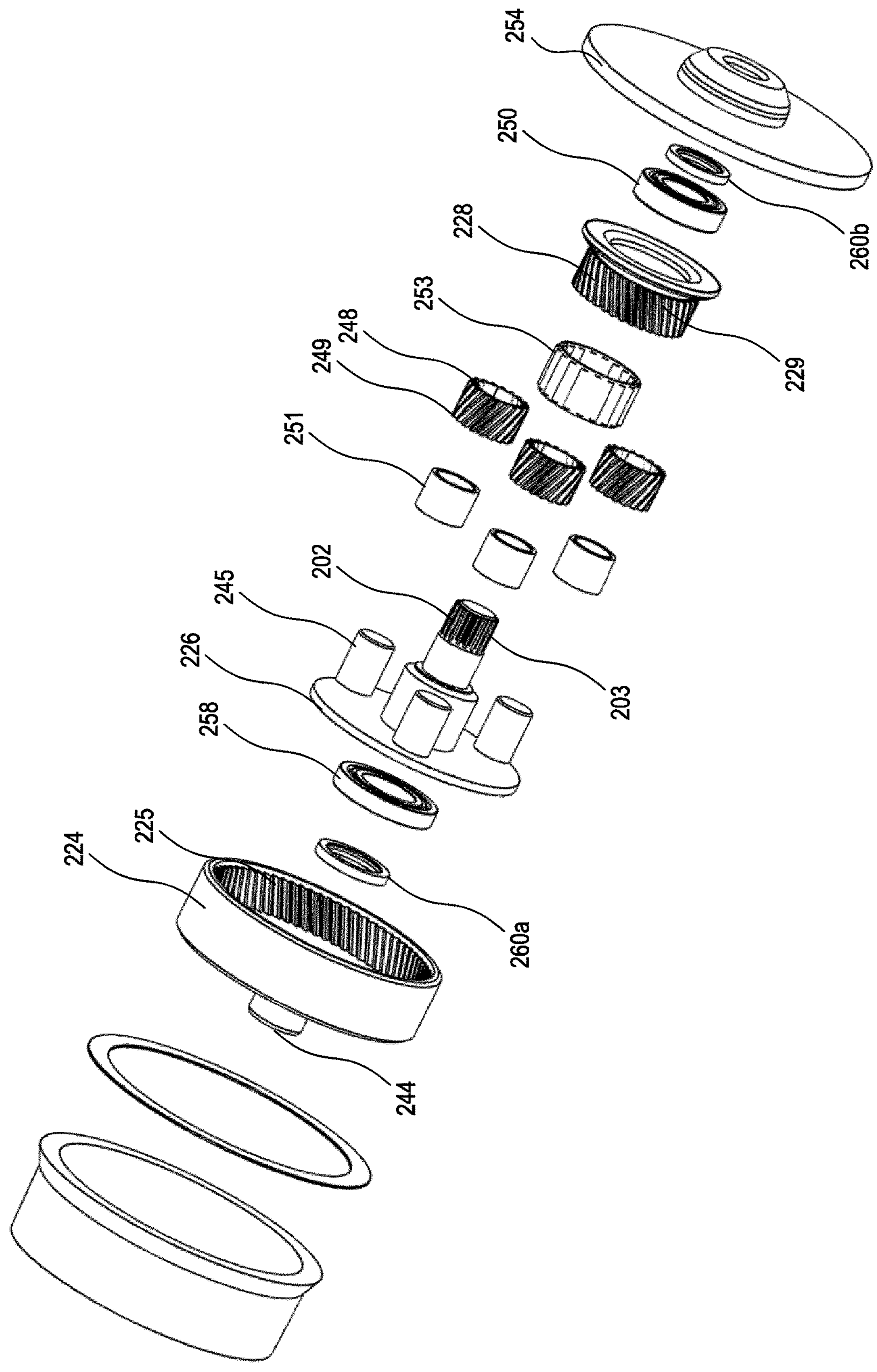
FIG. 12 is a perspective exploded view of the gear speed reducer of FIG. 8, with an enclosure removed.
Figure 13:
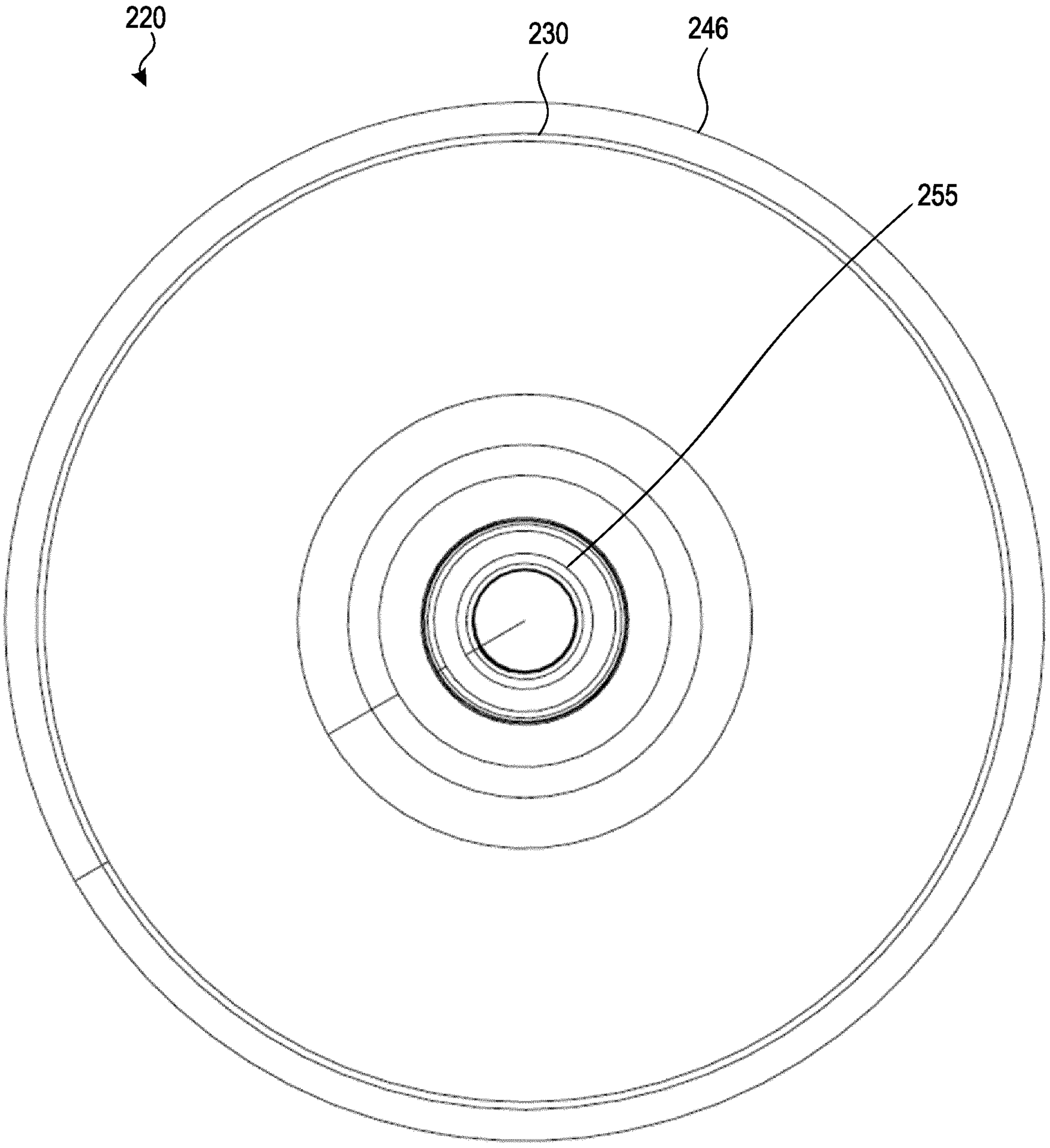
FIG. 13 is a front view of the gear speed reducer of FIG. 8.
Figure 14:
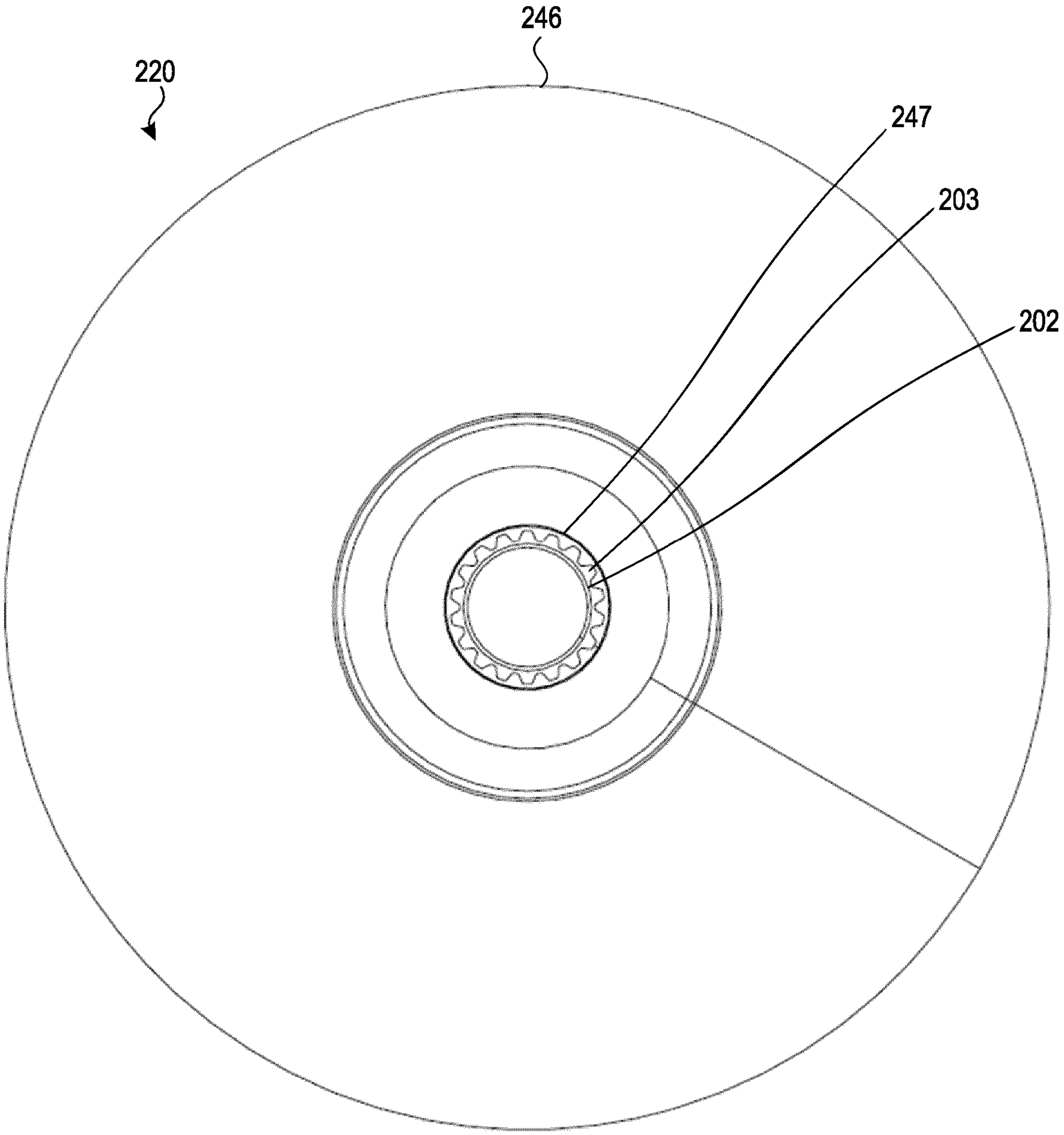
FIG. 14 is a rear view of the gear speed reducer of FIG. 8.
Figure 15:
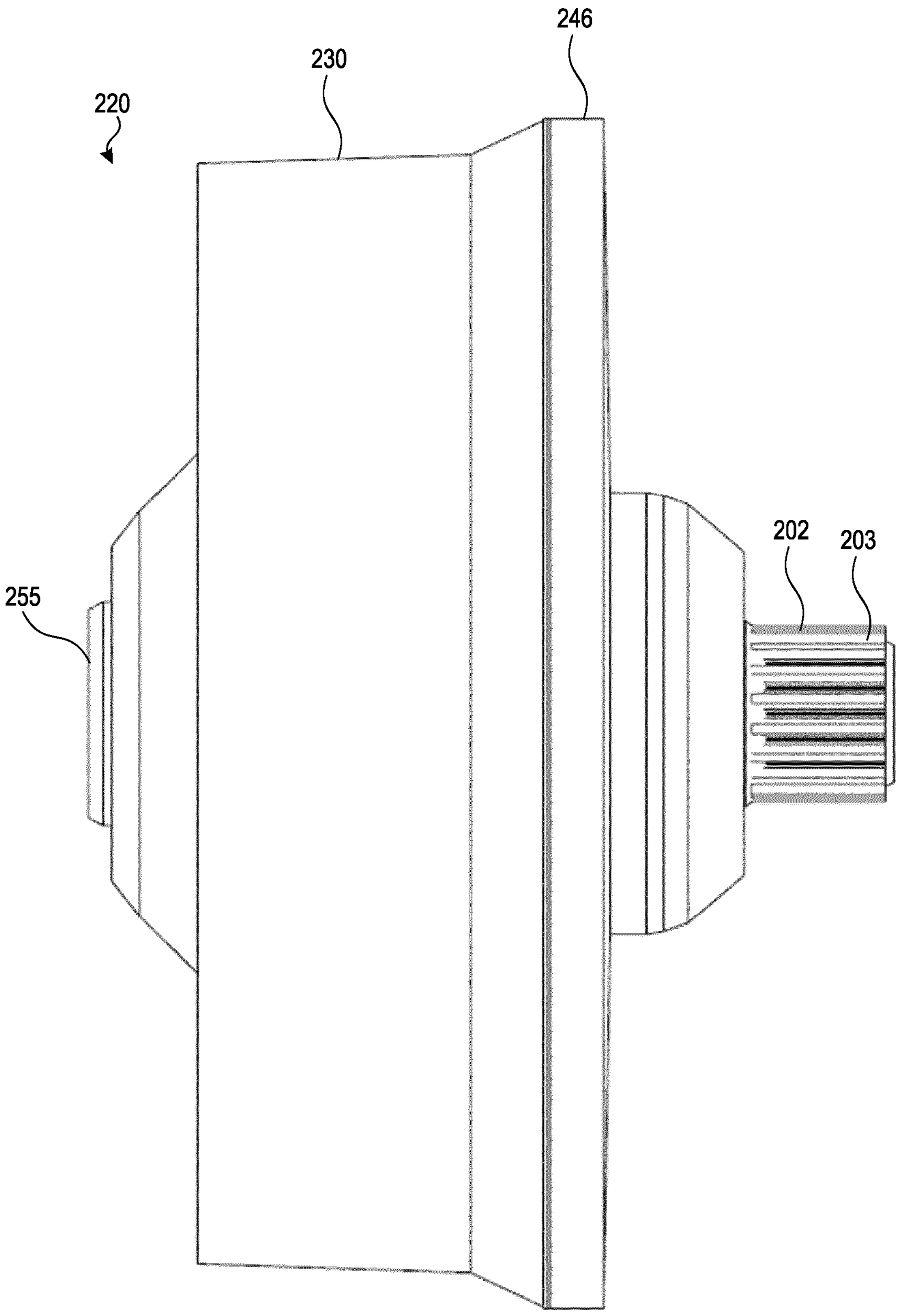
FIG. 15 is a side view of the gear speed reducer of FIG. 8.
Figure 16:
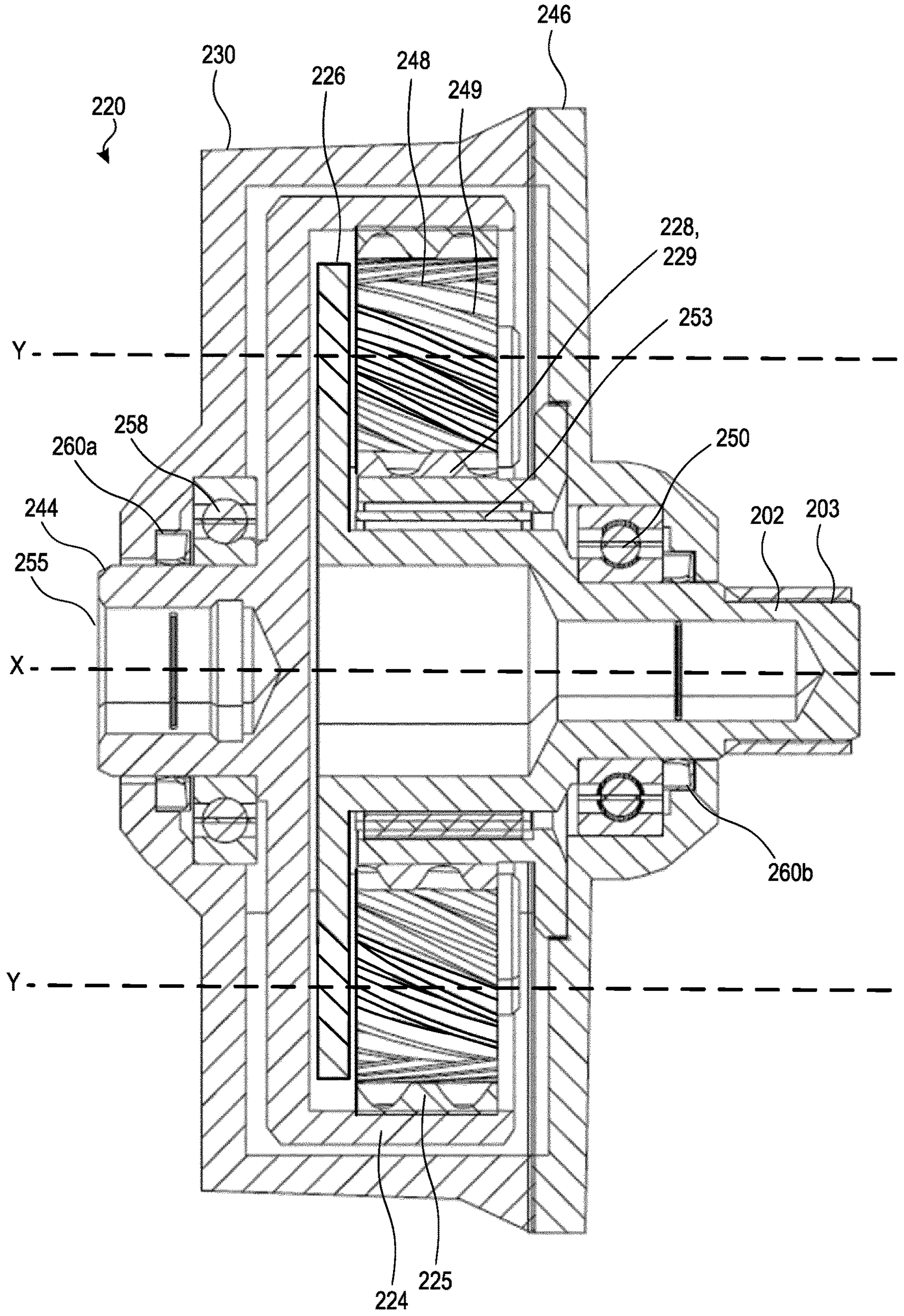
FIG. 16 is a longitudinal cross-sectional view of the gear speed reducer of FIG. 8.
Figure 17:
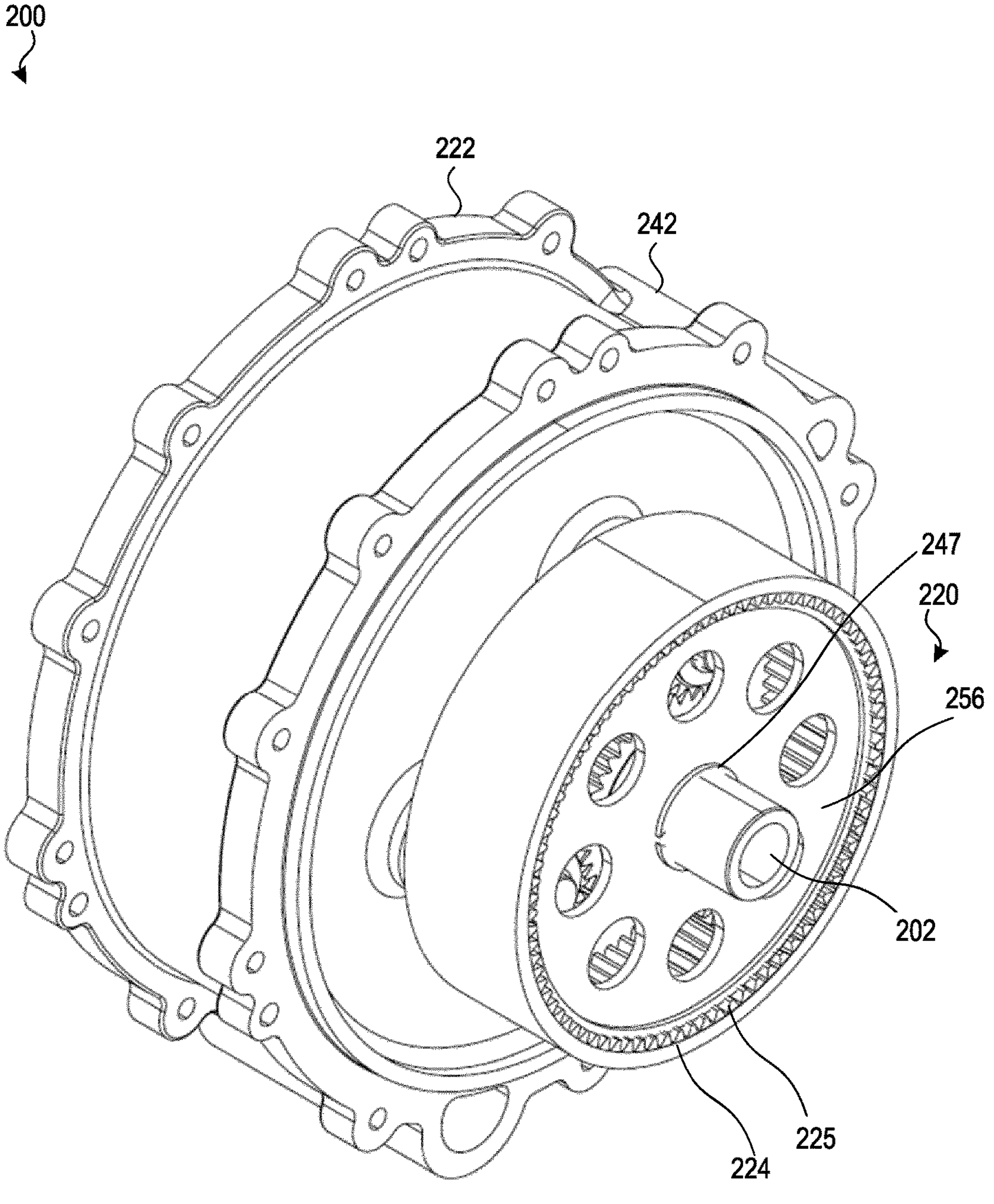
FIG. 17 is a perspective view of a gear speed reducer and electric motor, configured such that the gear speed reducer sits outside of and adjacent to the electric motor, constructed in accordance with principles of this disclosure, according to an example.
Figure 18:
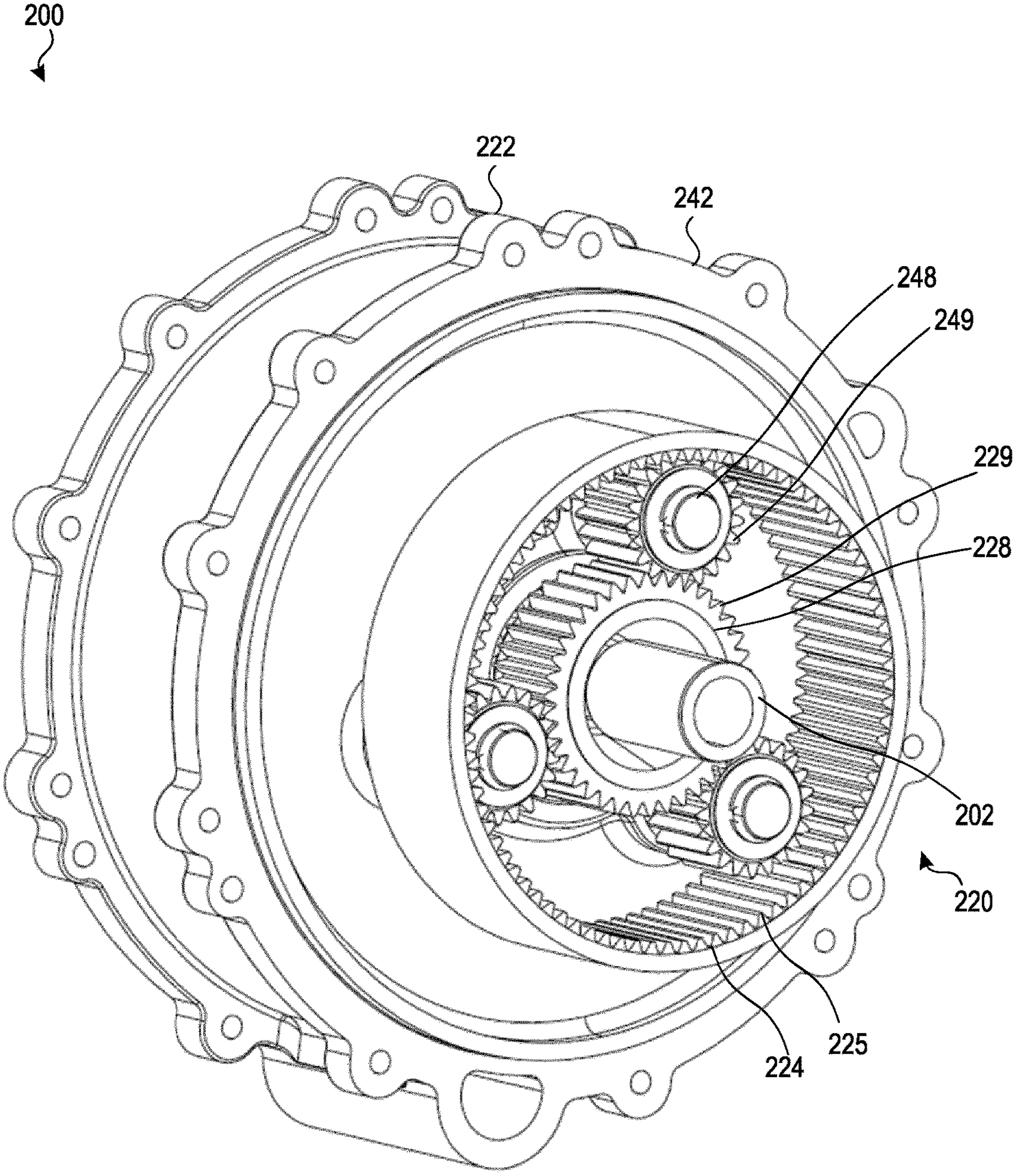
FIG. 18 is a rear perspective view of the gear speed reducer and electric motor of FIG. 17, with a back plate of the gear speed reducer removed.
Figure 19:
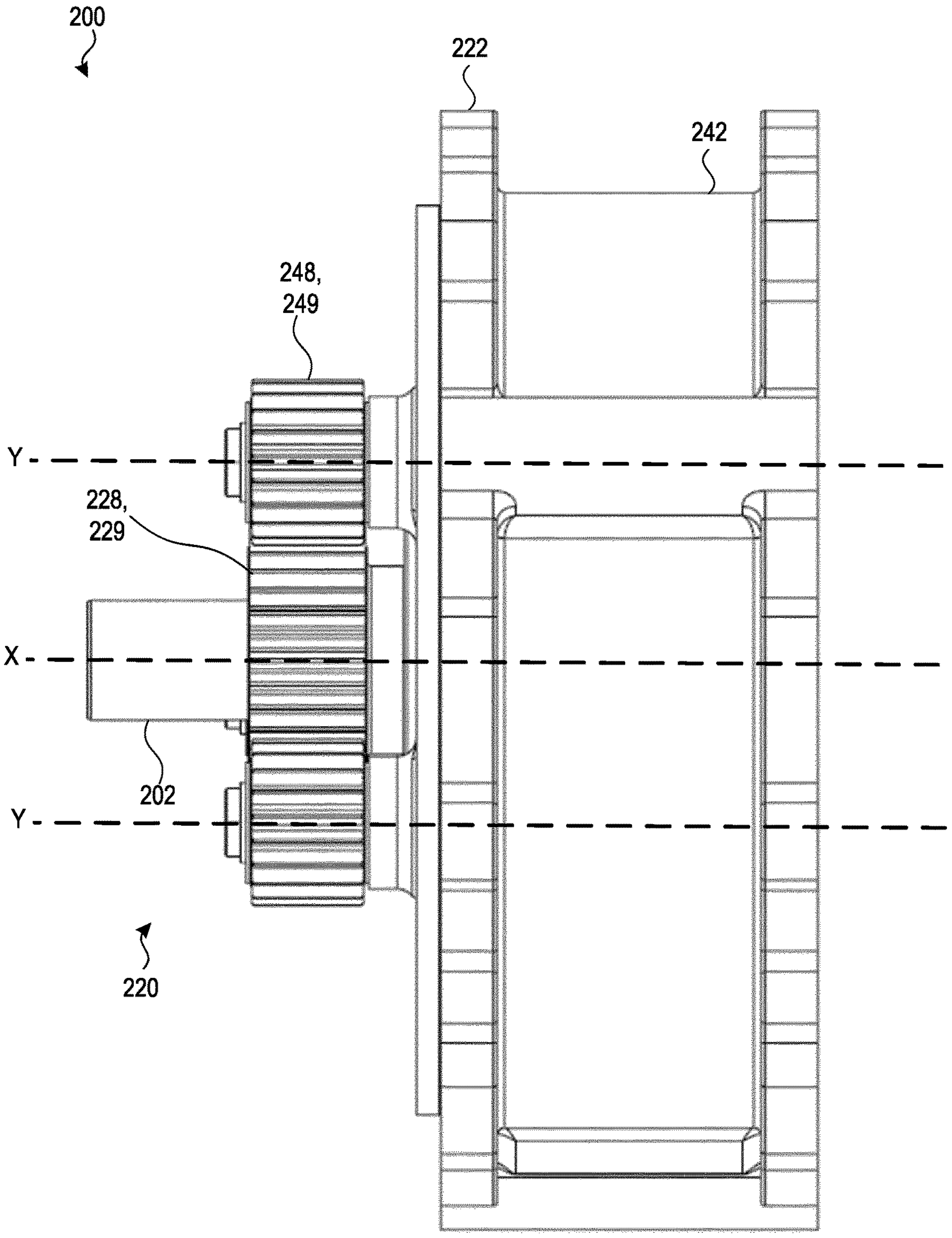
FIG. 19 is a side view of the of the gear speed reducer and electric motor of FIG. 17, with a back plate and ring gear of the gear speed reducer removed.
Figure 20:
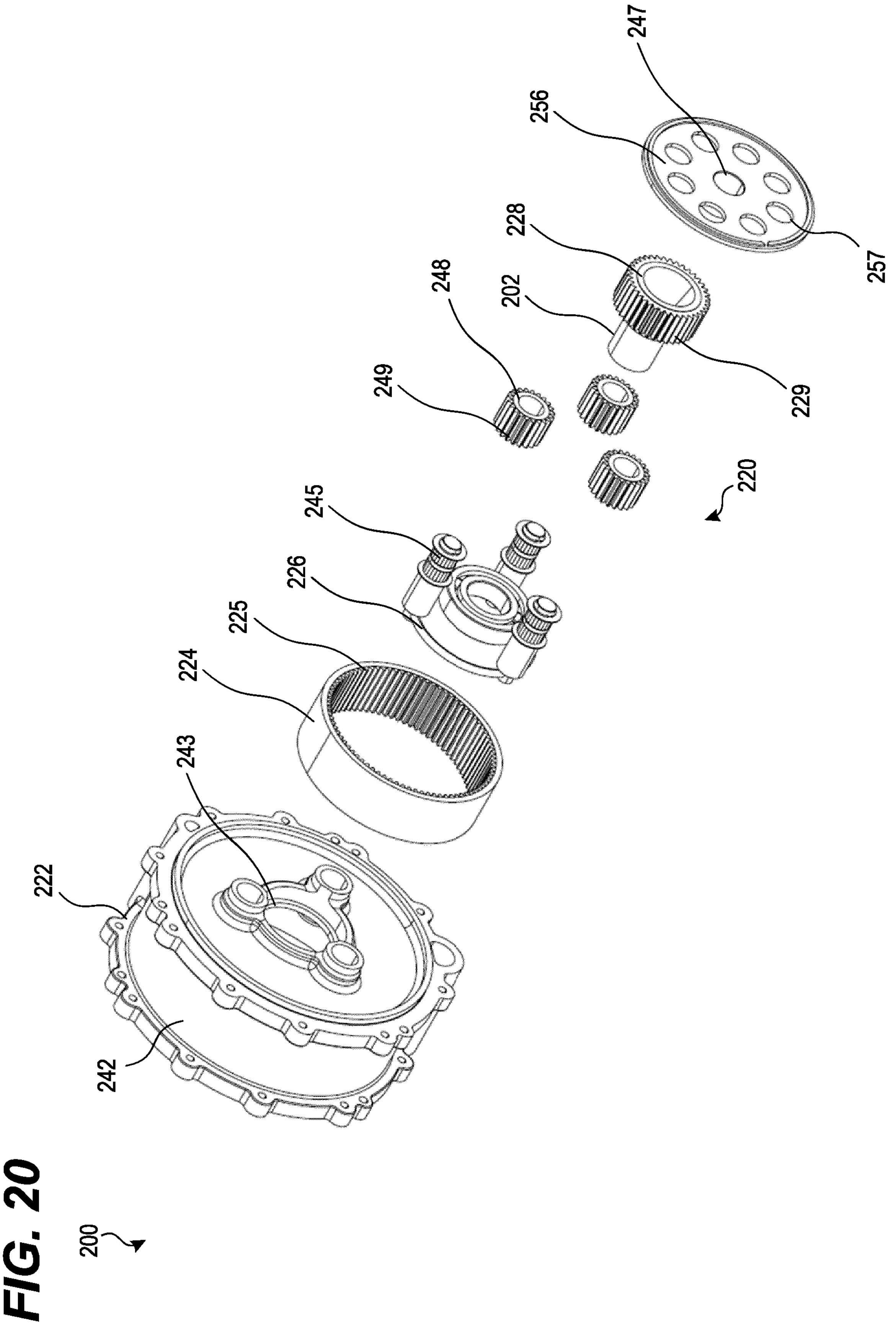
FIG. 20 is a perspective exploded view of the gear speed reducer and electric motor of FIG. 17.
Figure 21:
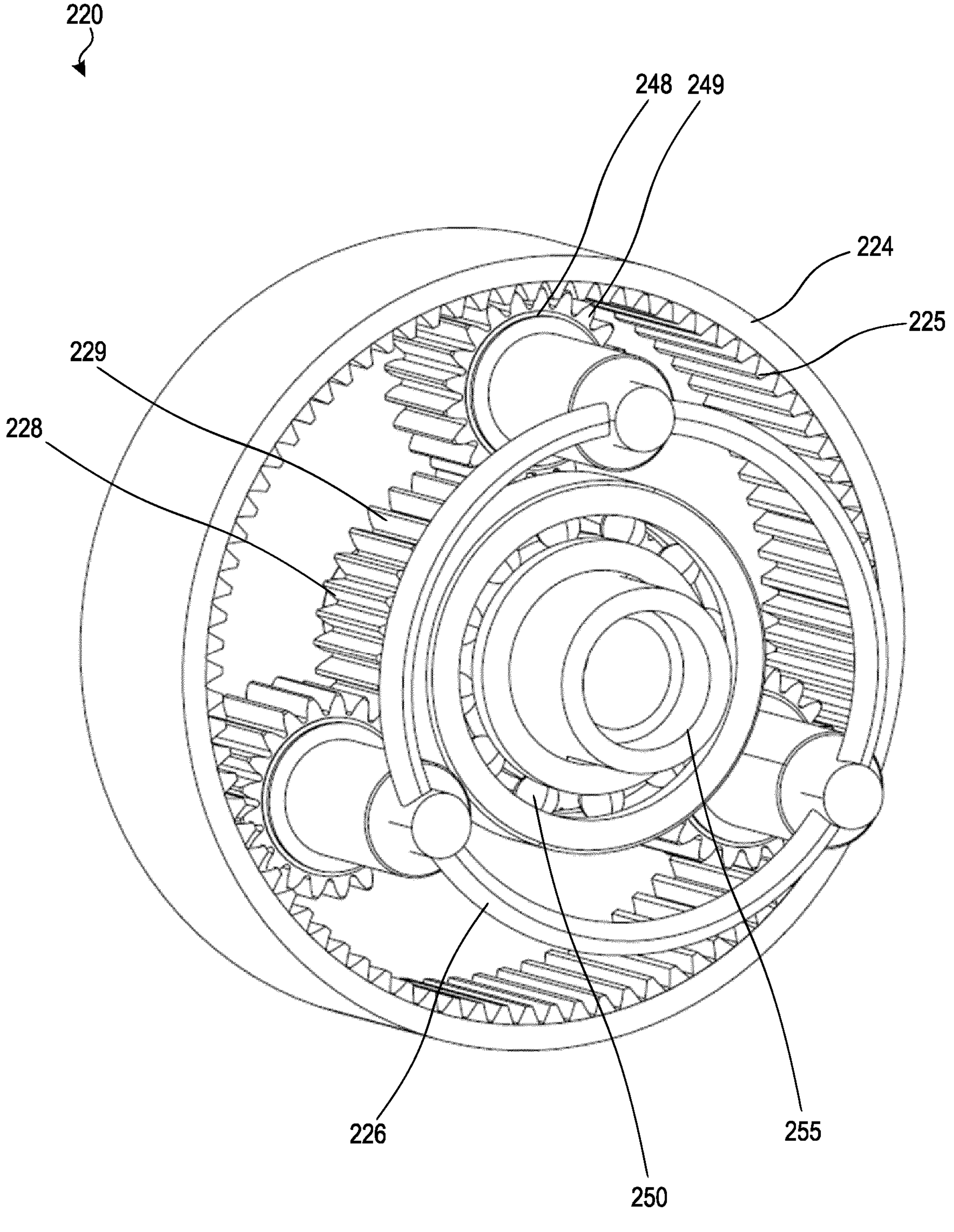
FIG. 21 is a is a front view of the gear speed reducer of FIG. 17.
Figure 22:
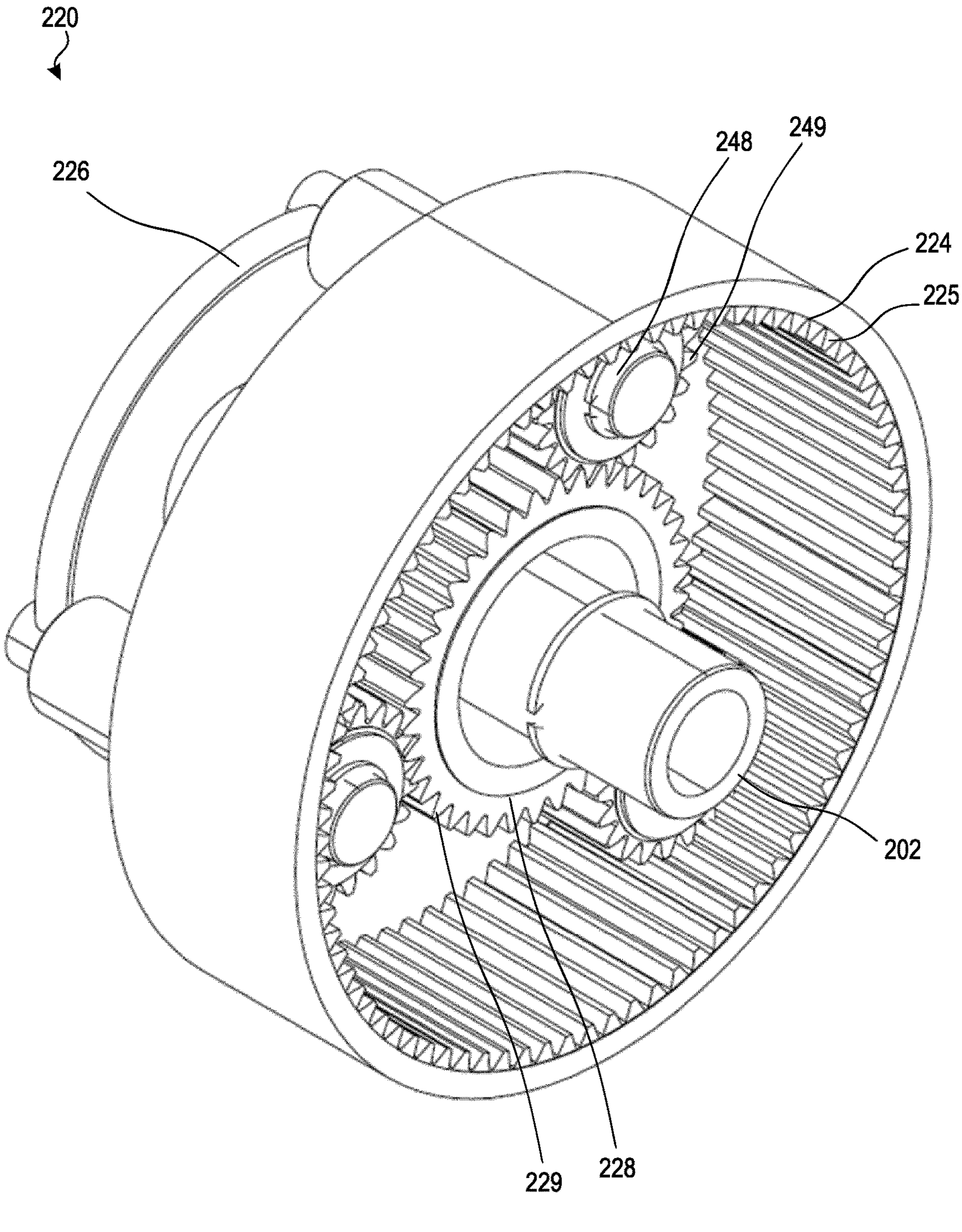
FIG. 22 is a rear view of the gear speed reducer of FIG. 17, with a back plate removed.
Figure 23:
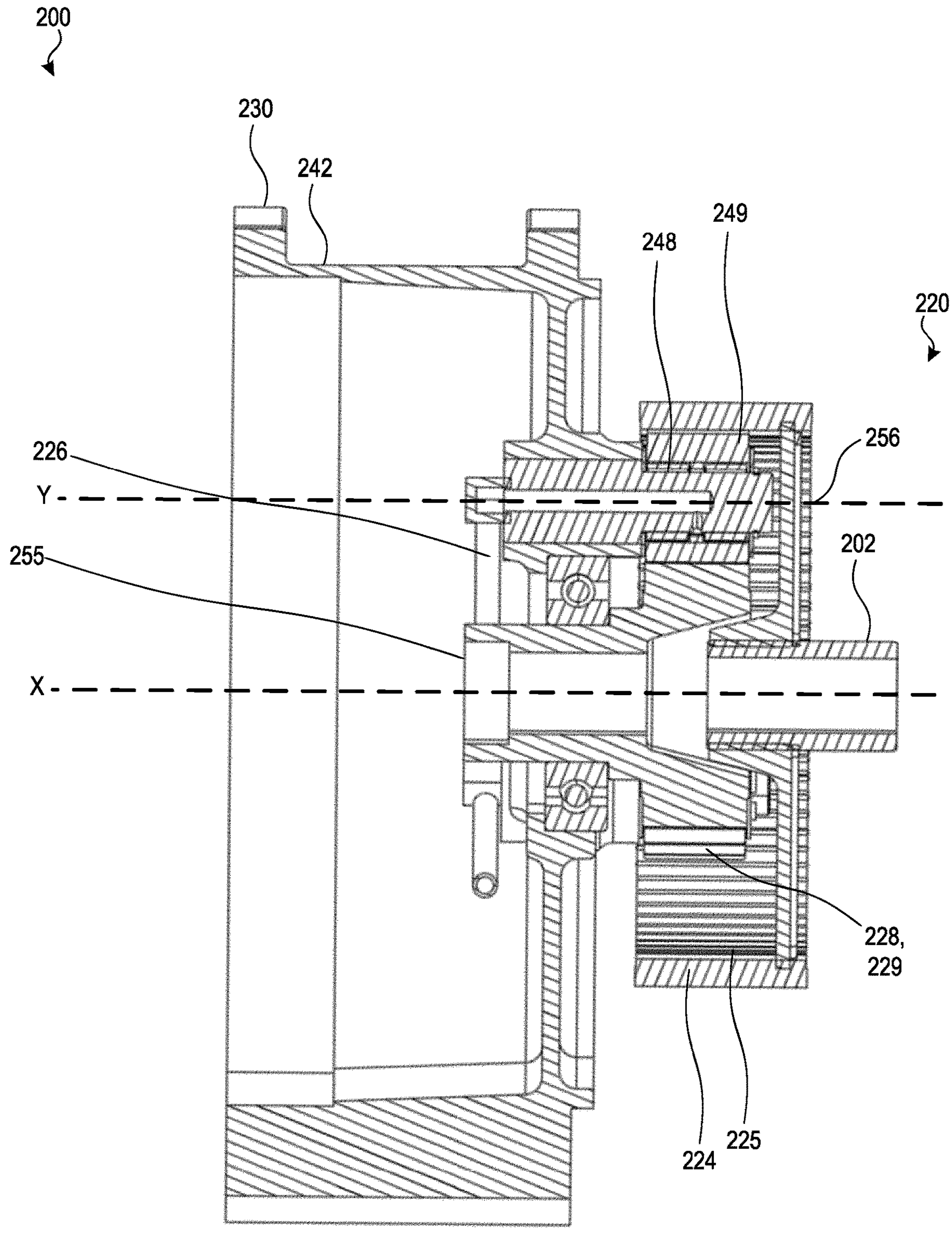
FIG. 23 is a longitudinal cross-sectional view of the gear speed reducer and electric motor of FIG. 17.
Figure 24:
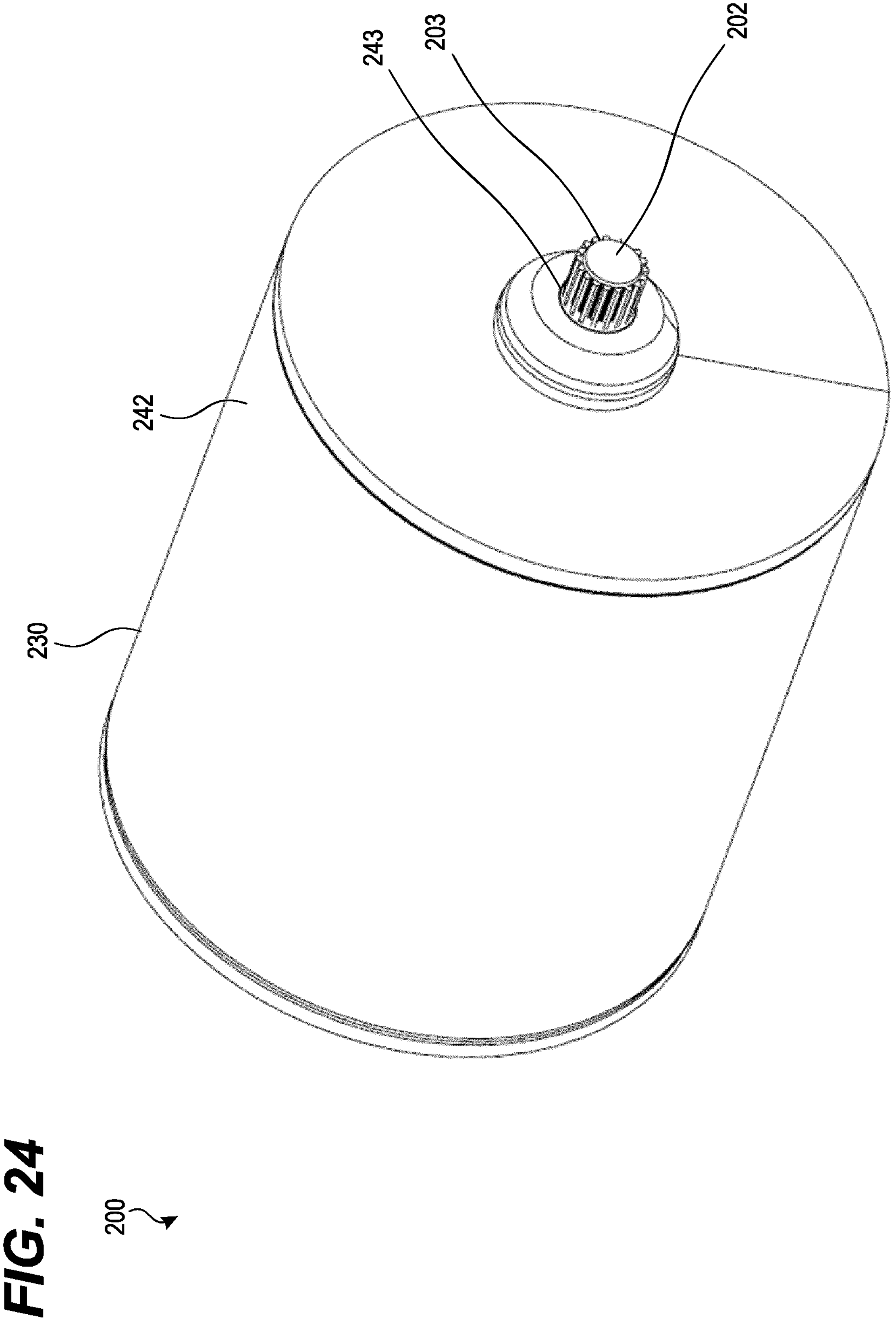
FIG. 24 is perspective view of an electric motor, configured such that a gear speed reducer sits within an enclosure of the electric motor, constructed in accordance with principles of this disclosure, according to an example.
Figure 25:
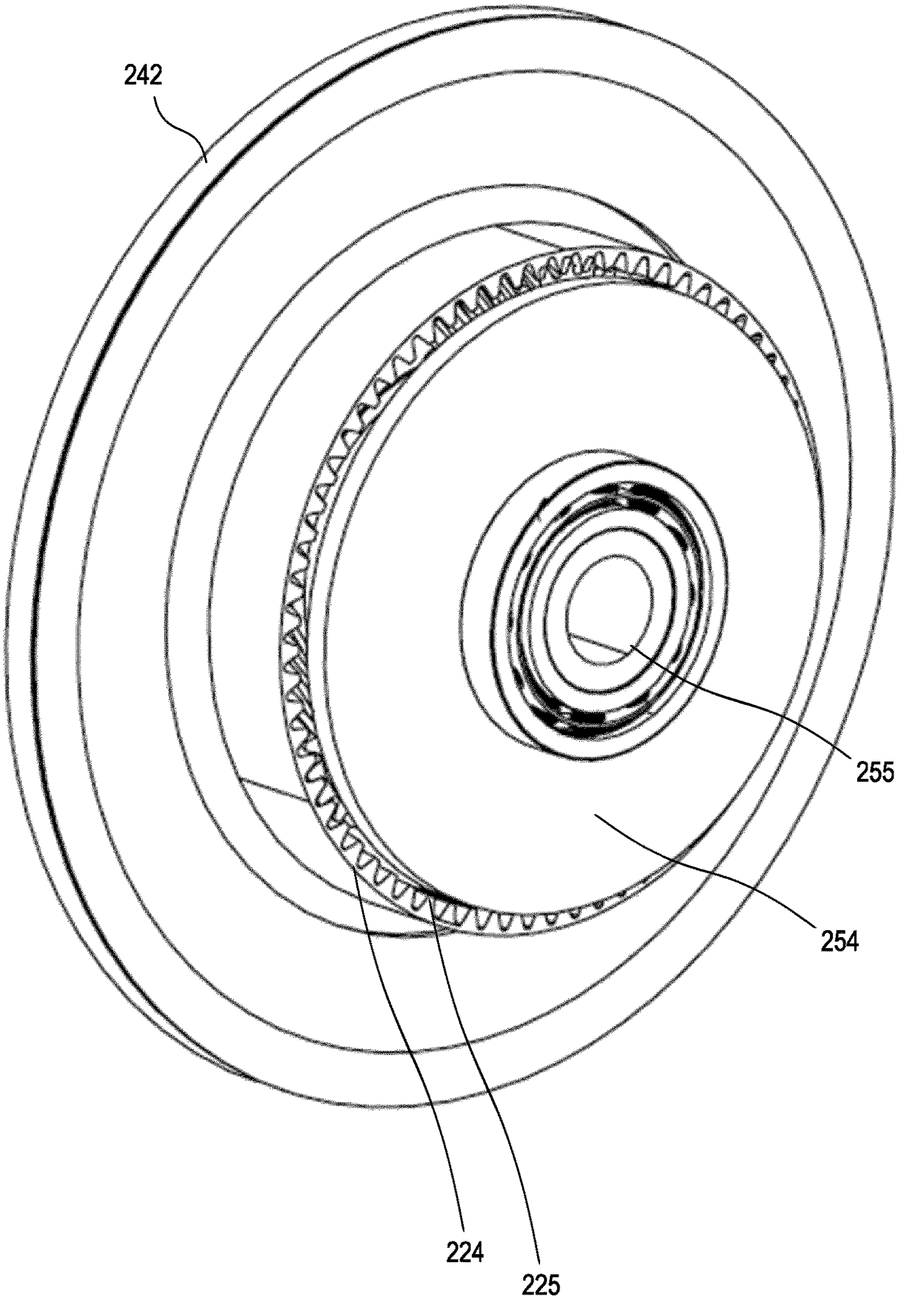
FIG. 25 is a front perspective view of a gear speed reducer situated within the enclosure of the electric motor of FIG. 24.
Figure 26:
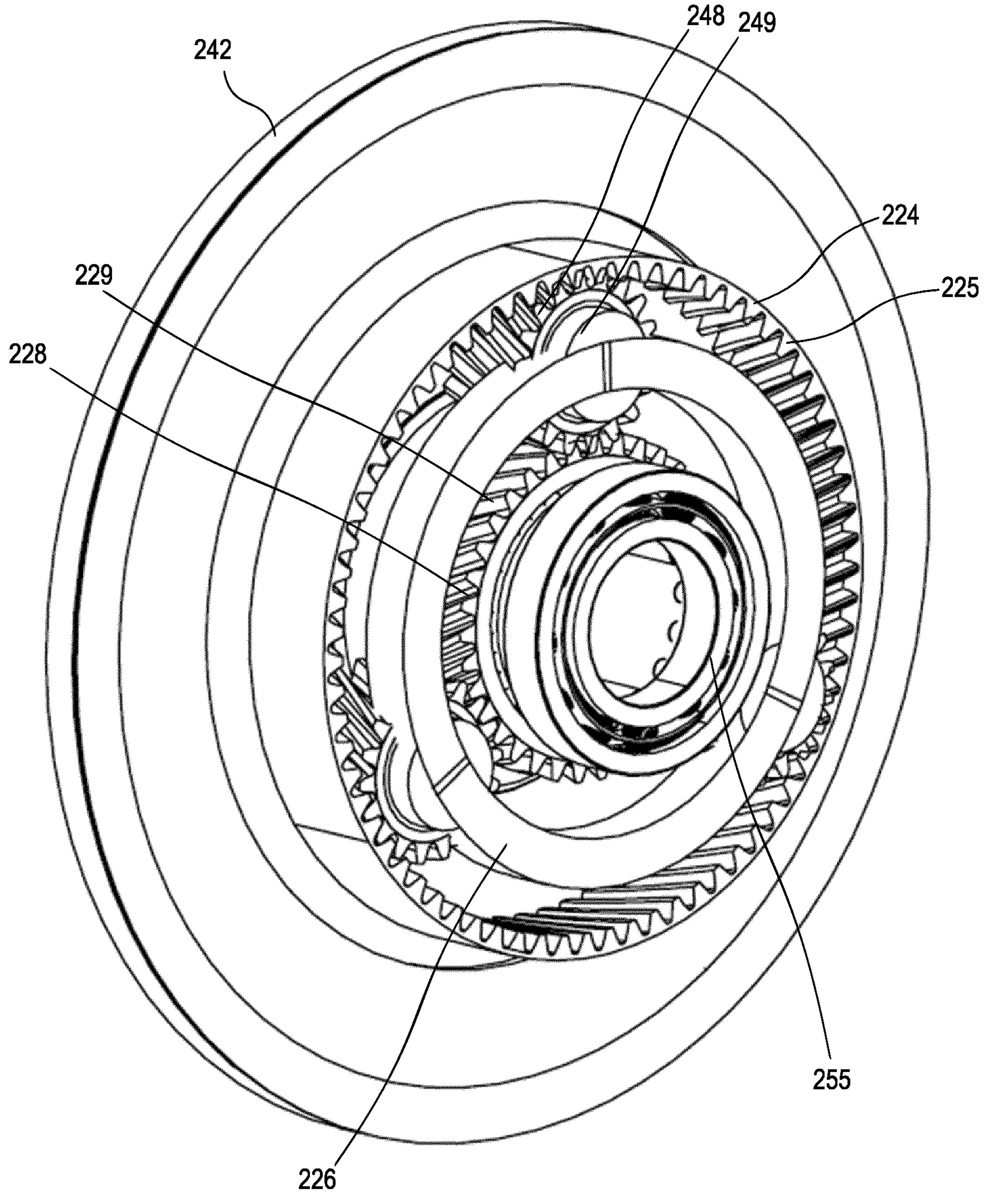
FIG. 26 is a front perspective view of the gear speed reducer of FIG. 25, with a front plate removed.
Figure 27:
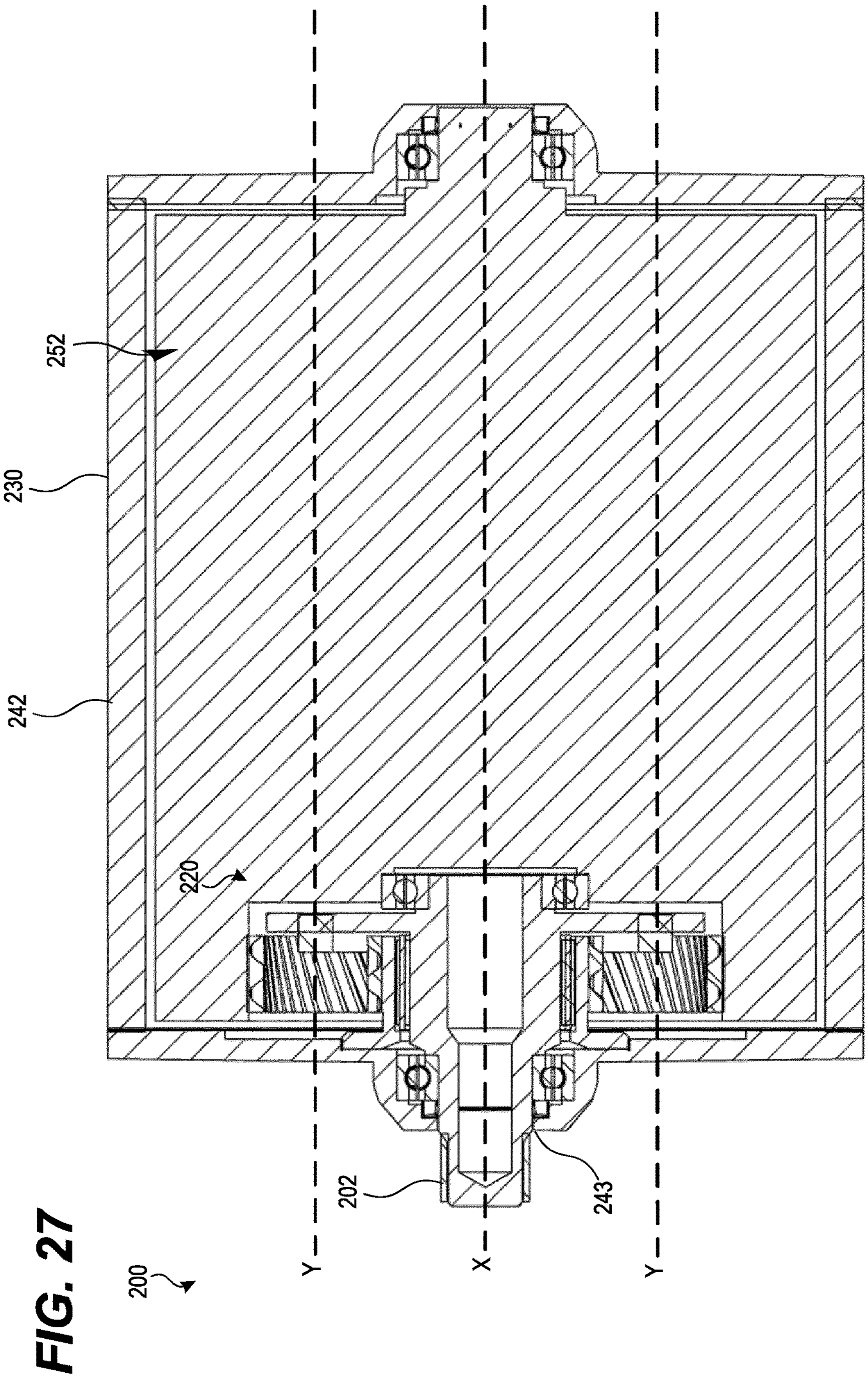
FIG. 27 is a longitudinal cross-sectional view of the gear speed reducer and electric motor enclosure of FIG. 24.
Figure 28:
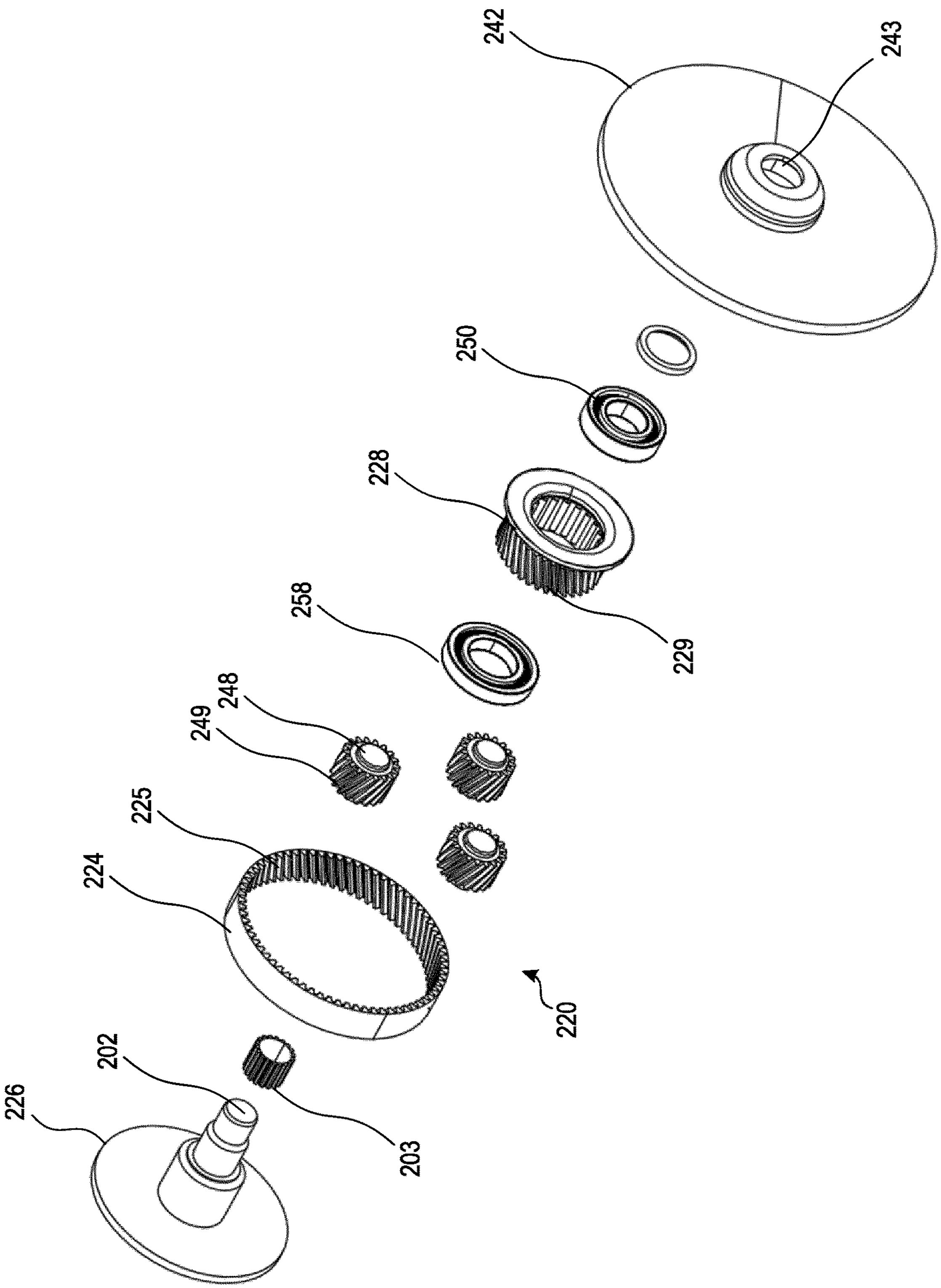
FIG. 28 is a perspective exploded view of the gear speed reducer of FIG. 25.
Figure 29:
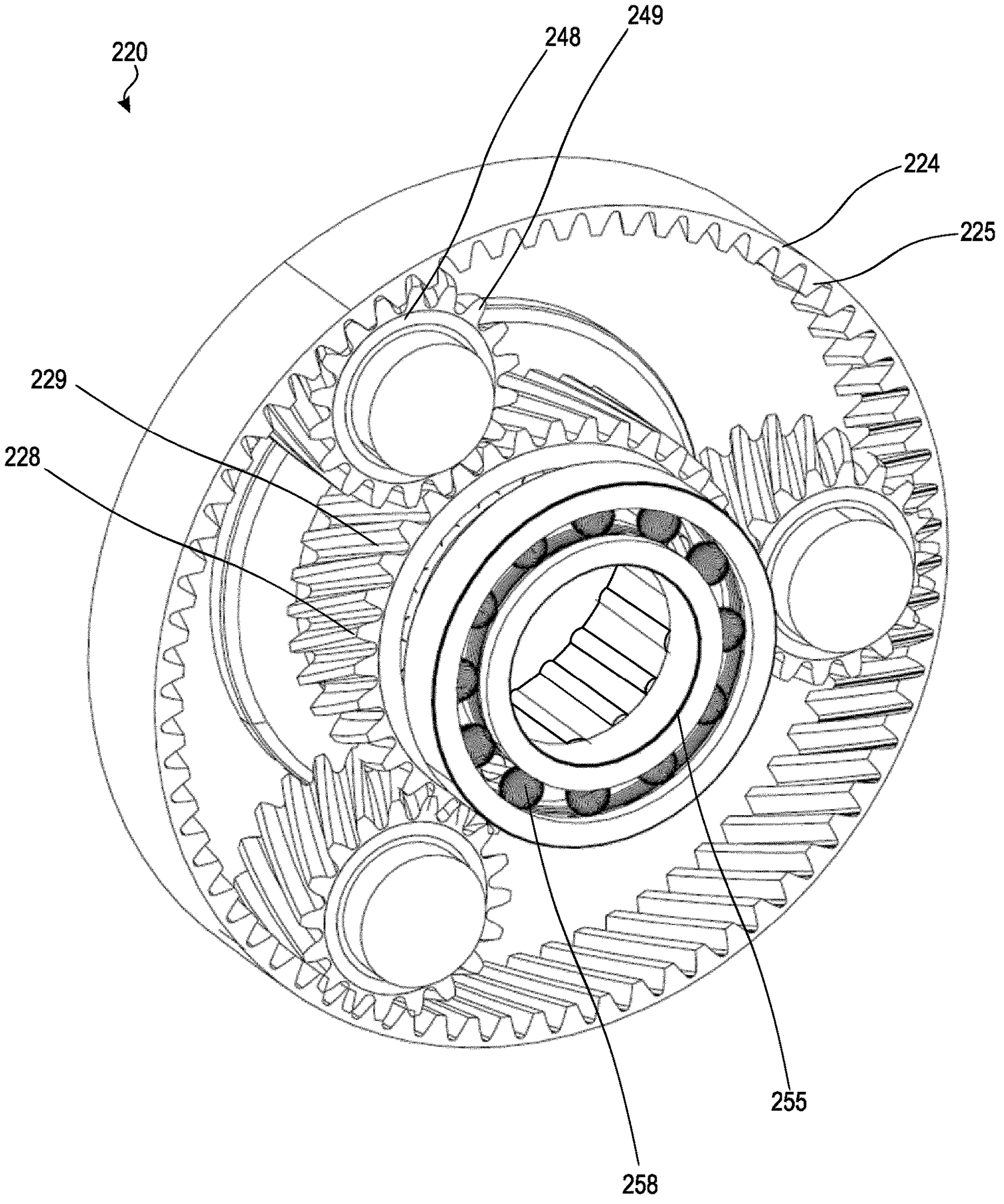
FIG. 29 is a front perspective view of the gear speed reducer of FIG. 25, with a front plate and planet carrier removed.
Figure 30:
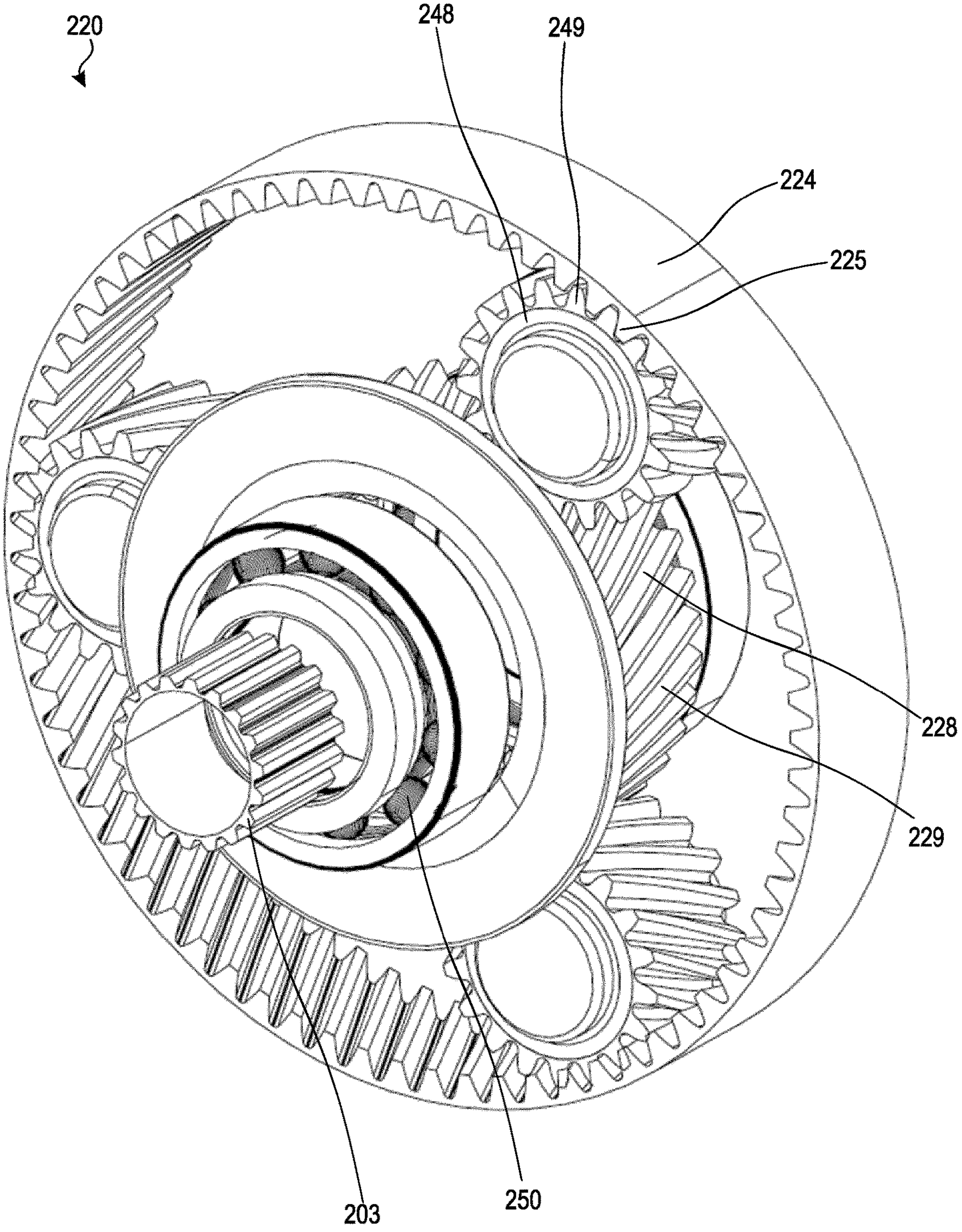
FIG. 30 is a rear perspective view of the gear speed reducer of FIG. 25, with a front plate and planet carrier removed.

The planet gears 248 are connected to one another via a planet carrier 226. Planet carrier 226 includes one or more members that connect the planet gears 248 to one another. In some examples, planet carrier 226 includes one or more members that form a ring-shape to connect the planet gears 248 (as depicted in FIG. 10, for example). In some examples, the planet carrier 226 may include members of a different shape, such as a multi-lobed shape or a multi-spoked shape. Each of the planet gears 248 rotate/spin about a central axis Y. The axes Y are parallel to axis X. The planet carrier 226 rotates about a central point on axis X, causing the planet gears 248 to move around a circular path perpendicular to axis X with axis X at its center. In some examples, each planet gear 248 surrounds and rotates around one or more planet needle bearings 251. Each of the planet gears 248 and/or the planet needle bearings may sit around a planet gear pin 245, which may be connected or fastened to the planet carrier 226.

In some examples, planet carrier 226 is shaped as a ring. In some examples, planet carrier 226 is shaped as a disc or plate. In some examples, planet carrier 226 includes a first portion substantially perpendicular to axis X, and a second portion that is integral to the output shaft 202. In some examples, the second portion defines a shaft that passes through the gear speed reducer 220 coaxial with axis X. In some examples, planet carrier 226 may rotate with output shaft 202.

Sun gear 228 is oriented coaxially with axis X, and spins/rotates about axis X. Ring gear 224 is oriented coaxially with axis X, and spins/rotates about axis X. Sun gear 228 and ring gear 224 are coaxial with each other, and with planet carrier 226 in some examples. In some examples, ring gear 224 rotates/spins in a same direction as planet gears 248. In some examples, ring gear 224 rotates/spins in an opposite direction as sun gear 228. In some examples, sun gear 228 rotates/spins in an opposite direction as planet gears 248. In some examples, one of the sun gear 228, the ring gear 224, or the planet carrier 226 may be grounded (i.e. held stationary).

In an example where the sun gear 228 is grounded, power may be provided to the ring gear 224. The ring gear 224 may rotate and its teeth 225 may mesh with the teeth 249 of planet gears 248, to rotate planet gears 248 in a same direction. The teeth 249 of planet gears 248 will mesh with the teeth 229 of sun gear 228, and because sun gear 228 is grounded and cannot rotate, the planet gears 248 will move in a circular path around the perimeter of sun gear 228, thereby rotating the planet carrier 226. This may further rotate which may rotate the output shaft 202 to transfer power (for example, to a gearbox).

In an example where the planet carrier 226 is grounded, power may be provided to the sun gear 228. The sun gear 228 may rotate and its teeth 229 may mesh with the teeth 249 of planet gears 248. Planet gears 248 will be caused to rotate in an opposite direction from sun gear 228, and because planet carrier 226 is grounded, planet carrier 226 will not rotate and planet gears 248 will not move in a circular path around sun gear 228. The teeth 249 of planet gears 248 may mesh with the teeth 225 of ring gear 224, and cause ring gear 224 to rotate/spin, which may rotate the output shaft 202 to transfer power (for example, to a gearbox).

In an example where the ring gear 224 is grounded, power may be provided to the sun gear 228. The sun gear 228 may rotate and its teeth 229 may mesh with the teeth 249 of planet gears 248, to rotate planet gears 248 in an opposite direction. The teeth 249 of planet gears 248 will mesh with the teeth 225 of ring gear 224, and because ring gear 224 is grounded and cannot rotate, the planet gears 248 will move in a circular path around the inner perimeter of ring gear 224, thereby rotating the planet carrier 226. This may further rotate which may rotate the output shaft 202 to transfer power (for example, to a gearbox).

In some examples, gear speed reducer 220 may include one or more bearings 250 to assist or facilitate rotation of one or more components of the gear speed reducer, including rotation of the sun gear 228 and/or rotation of output shaft 202.

In some examples, gear speed reducer 220 may include a front plate. A front plate may be separate from or integral to planet carrier 226. Planet carrier 226 may include a front opening 255 to facilitate connection to an electric motor. In some examples, a front plate may be operatively connected to and may rotate with planet carrier 226.

In some examples, gear speed reducer 220 includes of high precision gears, for example, gears (including the ring gear 224, sun gear 228, and/or planet gears 248) having quality class equal to or better than 5 per DIN, ISO, or AGMA industry standards. In some examples, gears of the gear speed reducer 220 (including the ring gear 224, sun gear 228, and/or planet gears 248) may have a surface roughness of gear flanks equal or less than Ra 0.5 μm. In some examples, gears of the gear speed reducer 220 (including the ring gear 224, sun gear 228, and/or planet gears 248) may have a surface roughness of gear flanks equal or less than Ra 0.4 μm. In some examples, gears of the gear speed reducer 220 (including the ring gear 224, sun gear 228, and/or planet gears 248) may have a surface roughness of gear flanks equal or less than Ra 0.3 μm. In some examples, gears of the gear speed reducer 220 (including the ring gear 224, sun gear 228, and/or planet gears 248) may have a surface roughness of gear flanks between Ra 0.4 μm and 0.5 μm. In some examples, gears of the gear speed reducer 220 (including the ring gear 224, sun gear 228, and/or planet gears 248) may have a surface roughness of gear flanks between Ra 0.3 μm and 0.5 μm.

In an example, gear speed reducer 220 includes one or more front bearings 258, that facilitate and support rotation of the ring gear 224 relative to an enclosure 230. In an example, gear speed reducer 220 includes one or more back bearings 250, that facilitate and support rotation of the output 202 relative to an enclosure 230.

In some examples, gear speed reducer may include one or more seals 260*a*, 260*b*.

FIGS. 17-23 illustrate an example of a gear speed reducer 220 and electric motor 222, configured such that the gear speed reducer 220 sits outside of and adjacent to the electric motor 222. In some examples, one or more aspects of the gear speed reducer 220 may be the same as described above relating to previous figures (for example, FIGS. 8-16).

In some examples, gear speed reducer 220 may include a perforated back plate 256. Perforated back plate 256 may be substantially plate or disc-shaped and may have a center opening 247 to allow for protrusion of the output shaft 202 through. Perforated back plate 256 may include one or more holes, openings, slots, or perforations 257. In some examples, perforations 257 may be circular in shape. In some examples, perforations 257 may be equally spaced around center opening 247.

Electric motor 222 may include an electric motor enclosure 242. An input shaft may exit the electric motor 222 at back opening 243 and enter front opening 255 of the gear speed reducer 220 to transfer power/rotation to the gear speed reducer 220.

FIGS. 24-30 illustrate an example of an electric motor 222, configured such that a gear speed reducer 220 sits within an enclosure 242 of the electric motor 222. In some examples, aspects of the gear speed reducer 220 and electric motor 222 may be the same as described above relating to previous figures (for example, FIGS. 8-23).

In an example, gear speed reducer 220 is located within an interior cavity 252 defined by the electric motor enclosure 242. In some examples, gear speed reducer 220 may be fully enclosed within electric motor enclosure 242, with the exception of a protrusion of output shaft 202 for interfacing with an externally located gearbox. In some examples, a back side of gear speed reducer 220 may be adjacent to or flush with a portion of the electric motor enclosure 242 (for examples, see FIG. 25).

Electric motor 222 may include an electric motor enclosure 242. In some examples, electric motor enclosure may include a back opening 243 through which the output shaft 202 of the gear speed reducer 220 may protrude, so that it may operatively interact with a gearbox. An input shaft (from an electric motor component located within the electric motor enclosure 242) may enter front opening 255 of the gear speed reducer 220 to transfer power/rotation to the gear speed reducer 220.

In a method, an input member of a gear speed reducer (for example, a gear or a member attached to a gear) may receive rotation at a first speed from an electric motor. The input may cause a first gear to rotate, which may then cause a second gear to rotate in a same or opposite direction, depending on the type and orientation of the first and second gears. In some examples, a third gear may be rotated by the rotation of the second gear, in the same or opposite direction, depending on the type and orientation of the second and third gear. The second gear (or third gear) may be connected to an output member (for example, an output shaft), which may provide rotation at a second speed from the output member to a gearbox. Power may be transferred from the electric motor to the gearbox by the gear speed reducer without substantial loss of power, while decreasing the rotational speed.

The first speed may be greater than the second speed. In an example, the first speed may be greater than the second speed by a ratio of between 1.3 to 1 and 3 to 1. In an example, the first speed is greater than the second speed by a ratio of between 1.3 to 1 and 2 to 1. In an example, the first speed is greater than the second speed by a ratio of 2 to 1. In an example, the first speed is greater than the second speed by a ratio of 3 to 1. In an example, the first speed is between 25,000 and 30,000 revolutions per minute.

For the purposes of this application, terms such as "left," "right," "front," "back," "upper," "lower," "upward," and "downward" are intended to be descriptive with reference to and in relation to the orientation shown in the Figures for clarity and are not meant to be limiting, but the examples as practiced and included in the scope of the claims may include examples where the systems and devices are in a different orientation.

While particular uses of the technology have been illustrated and discussed above, the disclosed technology can be used with a variety of environments in accordance with many examples of the technology. The above discussion is not meant to suggest that the disclosed technology is only suitable for implementation within the environments shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects described with respect to the Figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

What is claimed is:

1. A drive system for an electric vehicle, comprising:

a. a standalone gear speed reducer having a discrete enclosure with a plurality of first gears configured to provide a first speed reduction ratio between a first input and a first output of the gear speed reducer, the first input and the first output being coaxially aligned and extending to opposite open ends of the enclosure, the plurality of first gears including:

i) a ring gear connected to the first input;

ii) a plurality of planet gears intermeshed with the ring gear, wherein the plurality of planet gears are connected to each other by a planet carrier integrally forming the first output; and a sun gear intermeshed with the plurality of planet gears, wherein the sun gear is grounded to the enclosure;

and wherein the first input extends through the first open end and the first output extends through the second open end, and wherein the planet carrier is integrally formed as a unitary structure with a first output shaft, wherein a bearing is radially located between the sun gear and the planet carrier;

b. a gearbox having a plurality of second gears configured to provide a second speed reduction ratio between a second input and a second output of the gearbox, the second input being operably connected to the first output, the second output being configured to provide mechanical power for driving the electric vehicle; and c. an electric motor having a housing operably mounted to the gear speed reducer enclosure and having a third output extending to an open end of the housing and being coaxially aligned with and operably connected to the first input.

2. The drive system of claim 1, wherein the gear speed reducer is disposed between the electric motor and the gearbox.

3. The drive system of claim 1, wherein the electric motor is disposed between the gear speed reducer and the gearbox.

4. The drive system of claim 1, wherein the first speed reduction ratio is between 1.3 to 1 and 3 to 1.

5. The drive system of claim 4, wherein the first speed reduction ratio is 2 to 1.

6. The drive system of claim 4, wherein the first speed reduction ratio is 3 to 1.

7. The drive system of claim 1, wherein the electric motor provides a rotational speed between 25,000 and 30,000 revolutions per minute at the third output.

8. The drive system of claim 1, wherein the second speed reduction ratio is at least 10 to 1.

9. A drive system comprising:

a) an electric motor including a drive output and a housing, the drive output extending to an open end of the housing:

b) a gear speed reducer having an enclosure and having a plurality of first gears configured to provide a first speed reduction ratio between a first input, coaxially aligned with and coupled to the electric motor drive output, and a first output, the first input and the first output being coaxially aligned and extending to opposite open ends of the enclosure, the plurality of first gears including:

i. a ring gear connected the first input;

ii. a plurality of planet gears intermeshed with the ring gear, wherein the plurality of planet gears are connected to each other by a planet carrier integrally forming and connected to the first output; and iii. a sun gear intermeshed with the plurality of planet gears, the sun gear grounded to the enclosure;

iv. wherein a bearing is radially located between the sun gear and the planet carrier.

10. The drive system of claim 9, further comprising a back plate mounted to the ring gear on a side opposite the electric motor housing, wherein the back plate and the electric motor housing at least partially enclose the plurality of planet gears.

11. A gear speed reducer for an electric vehicle, comprising:

a) an enclosure defining opposite first and second open ends;

b) a first input extending to the first open end and being configured for coupling to a coaxially aligned electric motor drive output, wherein the first input defines a front opening for connection to an electric motor;

c) a first output coaxially aligned with the first input and extending to the second open end; and d) a plurality of first gears housed within the enclosure and configured to provide a first speed reduction ratio between the first input and the first output, the plurality of first gears including:

i. a ring gear, wherein the first input is connected to the ring gear;

ii. a plurality of planet gears intermeshed with the ring gear, wherein the plurality of planet gears are connected to each other by a planet carrier formed integral with and connected to the first output; and iii. a sun gear intermeshed with the plurality of planet gears, wherein the sun gear is grounded to the enclosure;

the first input is supported by a first bearing assembly mounted to the enclosure proximate the first open end and the first output is supported by a second bearing assembly mounted to the enclosure proximate the second open end, wherein a bearing is radially located between the sun gear and the planet carrier, and the enclosure includes a front cover defining the first open end and a first opening through which the first input extends and includes a back cover defining the second open end and a second opening through which the first output extends.

12. The gear speed reducer of claim 11, wherein the first speed reduction ratio is between 1.3 to 1 and 2 to 1.

13. The gear speed reducer of claim 11, wherein the first speed reduction ratio is 3 to 1.

* * * * *